United States Patent [19]
Nanbu et al.

[11] Patent Number: 6,053,443
[45] Date of Patent: Apr. 25, 2000

[54] DISPLAY FOR A FISHING REEL

[75] Inventors: Kazuya Nanbu, Tokorozawa; Yukinori Miyazawa, Higashikurume, both of Japan

[73] Assignee: Daiwa Seiko, Inc., Tokyo, Japan

[21] Appl. No.: 09/058,298

[22] Filed: Apr. 10, 1998

[30] Foreign Application Priority Data

| Apr. 11, 1997 | [JP] | Japan | 9-110431 |
| May 16, 1997 | [JP] | Japan | 9-143215 |

[51] Int. Cl.[7] .................................................. A01K 89/015
[52] U.S. Cl. ........................................ 242/223; 340/815.44
[58] Field of Search ................................. 242/223, 310; 340/815.44

[56] References Cited

U.S. PATENT DOCUMENTS

| 4,823,080 | 4/1989 | Lin | 324/175 |
| 4,934,628 | 6/1990 | Yamaguchi | 242/223 |
| 5,503,341 | 4/1996 | Kaneko et al. | 242/223 |
| 5,639,038 | 6/1997 | Hirose | 242/223 |

FOREIGN PATENT DOCUMENTS

| 62-144478 | 9/1987 | Japan . |
| 7-104151 | 4/1995 | Japan . |

*Primary Examiner*—Katherine A. Matecki
*Attorney, Agent, or Firm*—Liniak, Berenato, Longacre & White

[57] ABSTRACT

A fishing reel is provided with a display device. The display device is disposed on an upper surface of the reel main body and displays various kinds of measure information measured by a measuring instrument such as a fishing line length value and various kinds of set information. A display direction of display values in the display device is switchable in accordance with the specification of a handle or a visible direction. Further, the display values in the display device are arranged in a direction parallel to a direction in which a fishing line is played out.

13 Claims, 24 Drawing Sheets

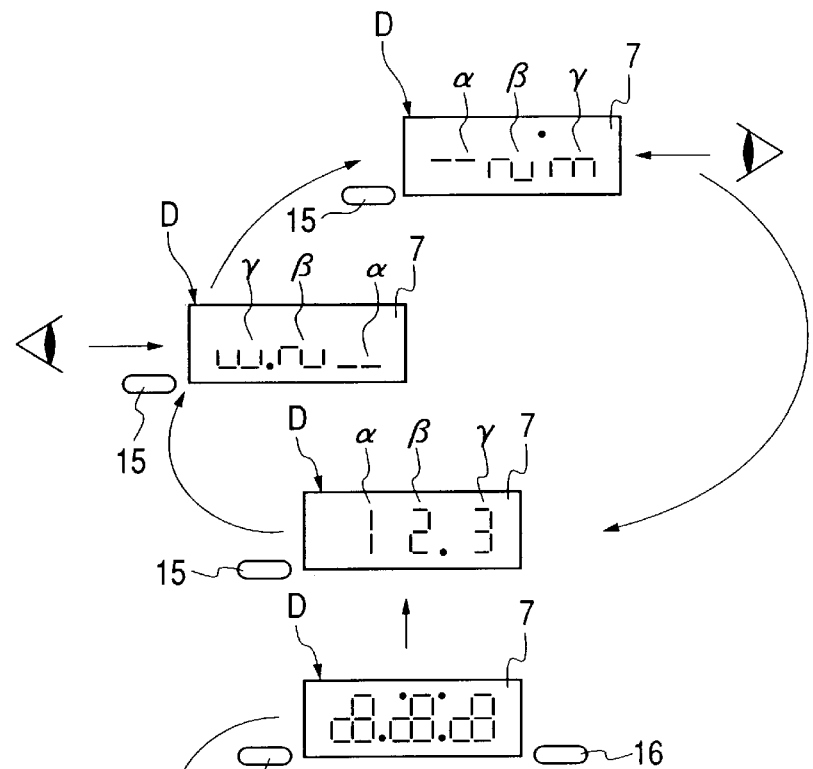
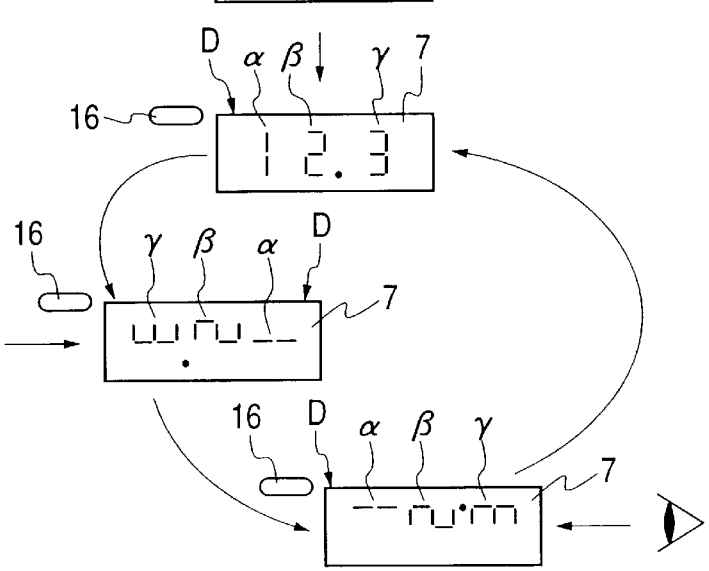
FIG. 4F
FIG. 4E
FIG. 4B
FIG. 4A
FIG. 4C
FIG. 4D
FIG. 4G
FIG. 4H

DISPLAY FOR A FISHING REEL

BACKGROUND OF THE INVENTION

1. Field of the Invention

The present invention relates to a fishing reel including a display device which is used to display various kinds of measured information and set information.

2. Description of the Related Art

Conventionally, as disclosed in Japanese Utility Model Publication No. 62-144478 of Showa, Japanese Patent Publication No. 7-104151 of Heisei, there is known a fishing reel including a fishing line length measuring instrument disposed in the upper portion of a reel main body and capable of measuring and displaying the play-out quantity and take-up quantity of a fishing line which is wound around a spool rotatably supported between the two side plates of the reel main body.

In these publications, numeric display values within a display device included in the fishing line length measuring instrument are displayed in such a manner that they are arranged and fixed in the axial direction of the spool. Due to this, there are still left in the conventional display device some problems to be solved as follows:

(1) When gripping and holding a fishing reel or rotating a handle provided in the fishing reel, some of the anglers grip and hold the fishing reel by their dominant hands, and others grip and hold the fishing reel in such a manner that the handle of the fishing reel can be rotated by their dominant hands.

In some fishing spots, it is better for the angler to grip and hold the fishing reel by his or her dominant hand, while rotating the handle by the other hand; and, in the others, it is better for the angler to rotate the handle by his or her dominant hand, while gripping and holding the fishing reel by the other hand. To cope with this, it is convenient to prepare two kinds of fishing reels: that is, one is a fishing reel which allows a fishing line to be wound around a spool by rotating a handle provided on the left side of the fishing reel (a fishing reel of a left handle type); and, the other is a fishing reel which allows a fishing line to be wound around a spool by rotating a handle provided on the right side of the fishing reel (a fishing reel of a right handle type). However, it is not economical to prepare two kinds of fishing reels.

Conventionally, there is known a fishing reel of a type structured such that the right and left directions of the reel main body thereof can be reversed right and left to thereby switch the fishing reel over to the so called left handle or right handle type fishing reel, so that the fishing reel is able to cope with the above-mentioned conditions of the fishing spots.

However, as described above, since the display device is disposed on the upper portion of the reel main body, if the direction of the reel main body is reversed, then the display direction of the numeric figure display portion within the display device is also reversed, which makes it difficult to recognize the display values visually; that is, in this case, the angler has to use in some patience the fishing reel that is not able to deal with the conditions of the fishing spot sufficiently. This means that the fishing reel provides a poor efficiency in the angling operation.

Also, even when the reel main body is structured so that it can be used in common for the left- and right-handle fishing reels, if the display device is disposed on its associated reel side plate, it is necessary to produce two kinds of reel side plates which can be used exclusively for the left and right handles.

(2) Depending on the direction in which an angler looks at the fishing reel in an actual fishing operation, the display values may be seen sideways so that they are difficult to read, that is, it is not possible for the angler to recognize the display values such as the fishing line length value and the like easily and smoothly in the actual fishing operation.

For example, when the angler leaves the fishing position for some reason or other while leaving the fishing rod in the fishing position in boat fishing or the like, if the angler sees the display values sideways with respect to the fishing reel, then the display values are difficult to read even when they are arranged in the forward direction thereof.

Moreover, in these publications, the display device of the fishing line measuring instrument is disposed outside one of the two side plates of the reel main body, while the display values of the present display device are displayed in such a manner that the numerical values thereof are arranged in the axial direction of the spool. Due to this, there are further left in the conventional display device some problems to be solved as follows:

(3) Since the display device projects outwardly of the side plate, not only the display device increases the size of the fishing reel outwardly in the axial direction thereof but also it is easy to drop down or can be butted against some other thing, that is, the display device can be influenced by an external force, so that the display device is easy to break down.

SUMMARY OF THE INVENTION

The present invention aims at eliminating the above-mentioned drawbacks found in the conventional fishing reel. Accordingly, it is an object of the invention to provide a fishing reel which is capable of changing the direction of the electric figure display values within the display device according to the handle specifications to thereby facilitate the visual recognition of the display values.

In addition, it is an object of the invention to provide a fishing reel in which a display device stays in the width of its associated side plate and thus does not project outwardly thereof, so that not only the fishing reel can be made compact and the gripping and holding conditions of the fishing reel can be improved, but also the thumbing operation and fishing line insertability of the fishing line can be improved.

In attaining the above object, according to the invention, there is provided a fishing reel which includes, in a reel main body supporting a spool in a freely rotatable manner, a display device of a measuring instrument for displaying various kinds of measured information and set information, characterized in that the direction of electric figure display values within the display device disposed on the upper portion of the reel main body can be changed.

In addition, in attaining the above another object, there is provided a fishing reel including, in a reel main body supporting a spool in a freely rotatable manner, a display device forming a part of a measuring instrument for displaying various kinds of measured information and set information, in which display values within the display device disposed in the upper portion of the reel main body are arranged in such a manner that they are long in a fishing line play-out direction.

BRIEF DESCRIPTION OF THE DRAWINGS

Similar reference characters denote corresponding features consistently throughout the attached drawings. The preferred embodiments of this invention will be described in detail, with reference to the following figures, wherein:

FIGS. 4A to 4H are explanatory views of the switching operations of an electric figure display portion within the display device, respectively corresponding to FIGS. 1 and 2;

DETAILED DESCRIPTION OF THE PREFERRED EMBODIMENTS

Figure 1:
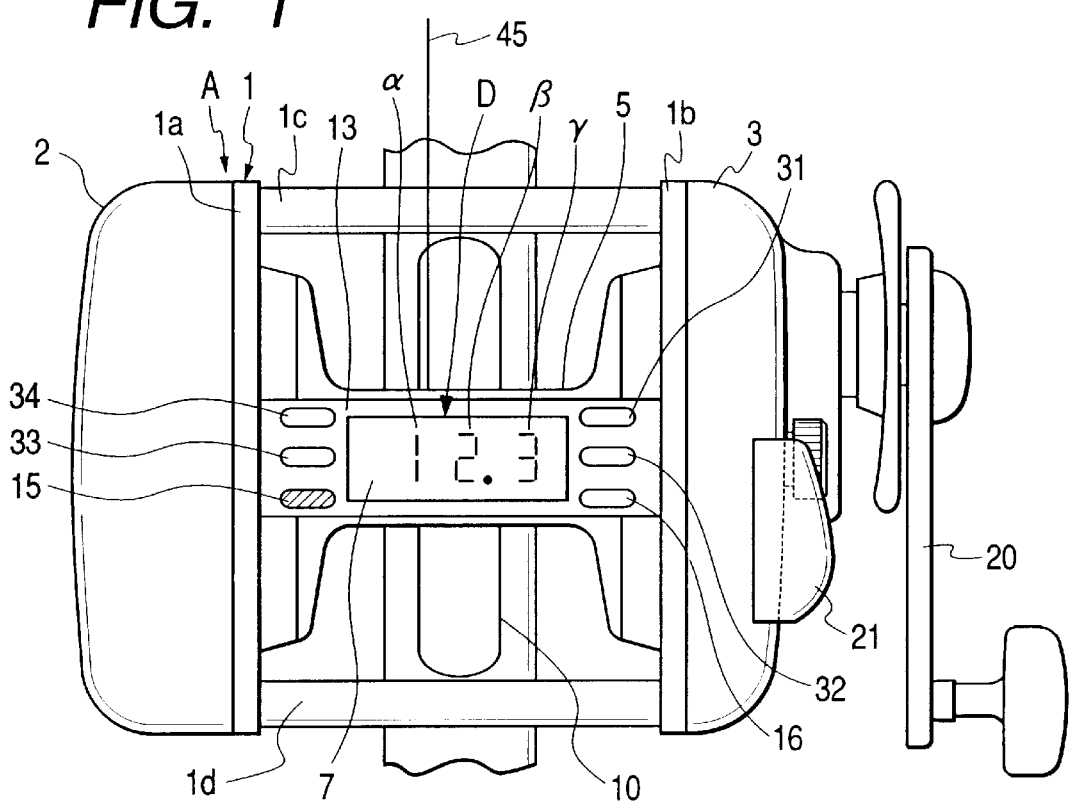
FIG. 1 is a plan view of a fishing reel of a right handle type according to a first embodiment of the invention.

Now, description will be given below of the invention by means of the embodiments thereof illustrated herein.

The reel main body A of the present fishing reel includes a side frame 1 and two side plates 2, 3 which are respectively mounted on the two outside portions of the side frame 1.

The side frame 1 includes two left and right frame sections 1a and 1b which are held in parallel to and integrally with each other by two front and rear finger placement plates 1c, 1d as well as by a fixing plate 1e provided in a reel leg 10.

A support plate 4 and the reel side plate 2 are respectively mounted on the outside of the left side frame section 1a.

In particular, the support plate 4 is mounted on the left side frame section 1a by a screw 11.

On the other hand, the reel side plate 3 is mounted on the outside portion of the right side frame section 1b.

A spool 5 is interposed between the left and right side frame sections 1a and 1b in such a manner that it is attached to a spool shaft 6, while the spool shaft 6 is rotatably carried by a solid bearing 12 and a ball bearing B, which are respectively arranged on the support plate 4 side, as well as by a solid bearing 12 and a ball bearing B which are respectively arranged on the right side frame section 1b side.

Each of the solid bearings 12 is formed of metal or synthetic resin, while each of the ball bearings B is composed of a waterproof bearing.

A hold member 13 for holding a display device D of a measuring instrument C is mounted on the upper portion of the spool 5 which is interposed between the two left and right side frame sections 1a and 1b.

An electric figure display portion 7, which is included in the display device D, is arranged in the axial direction of the spool 5.

The display device D is structured such that it allows the electric figure display portion 7 to display numerically not only various kinds of measuring information measured by the measuring instrument C such as a fishing line length value and the like but also various kinds of set information. Here, the display device D may also be structured such that, when the fishing reel is left not operated for a given period of time, the numerical display by the electric figure display portion 7 disappears.

The electric figure display portion 7 within the display device D is formed of an LCD (Liquid Crystal Display) or an LED (Light Emitting Diode).

Figure 8:
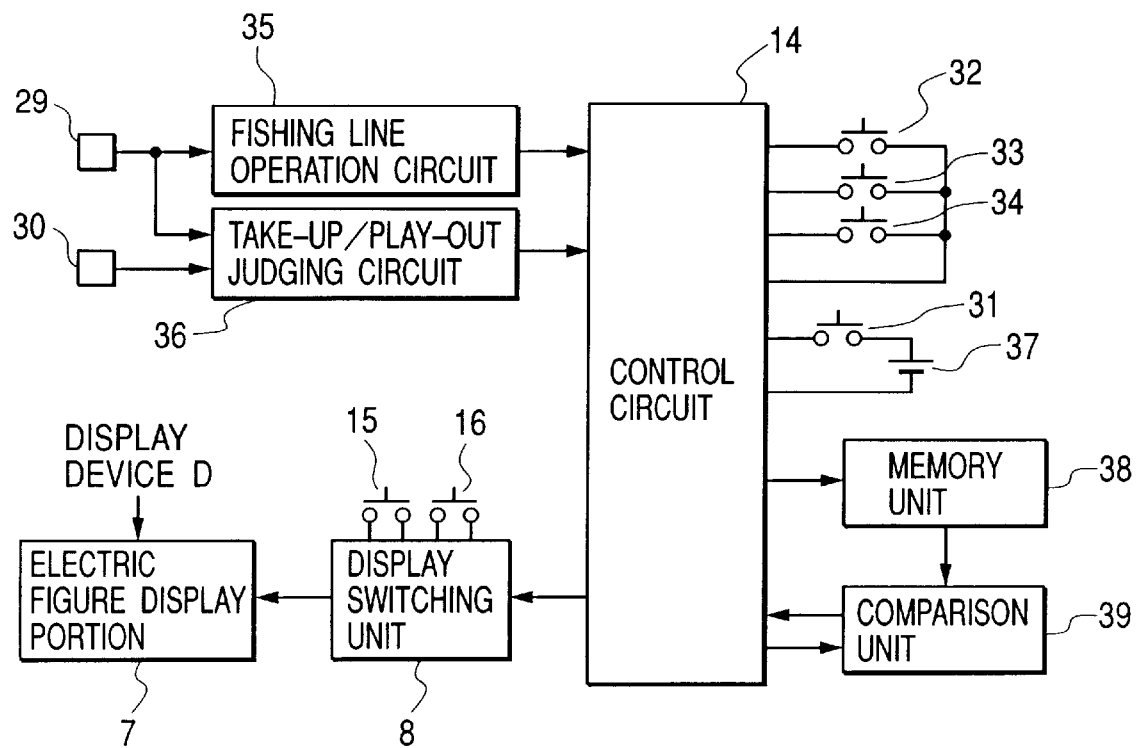
FIG. 8 is a block diagram of a control circuit included in a measuring instrument employed in the fishing reel according to the first embodiment.

Also, the electric figure display portion 7 is connected to a control circuit 14 shown in FIG. 8 through a display switching unit 8 which is connected to the control circuit 14.

The display switching unit 8 includes two switch buttons 15, 16 as well as two switches having the same designations as the present switch buttons, that is, 15, 16.

Figure 3:
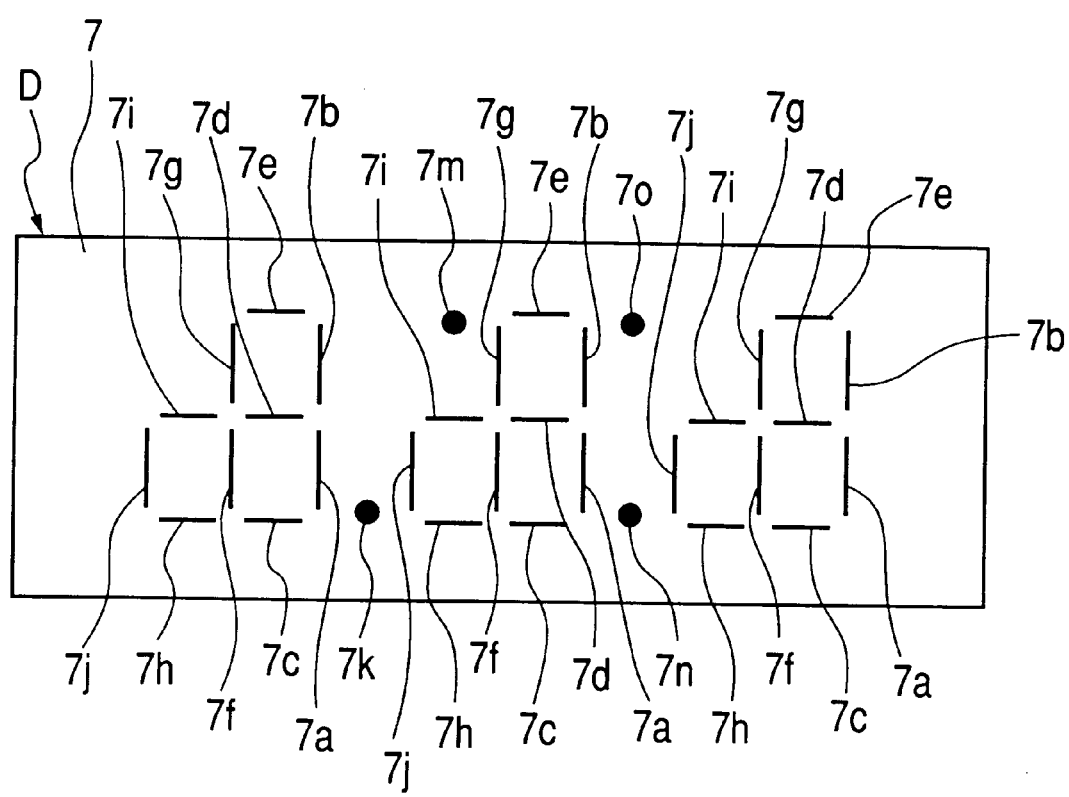
FIG. 3 is an enlarged plan view of a plurality of segments which are used to display electric figure display values within a display device employed in the first embodiment.
Figure 5:
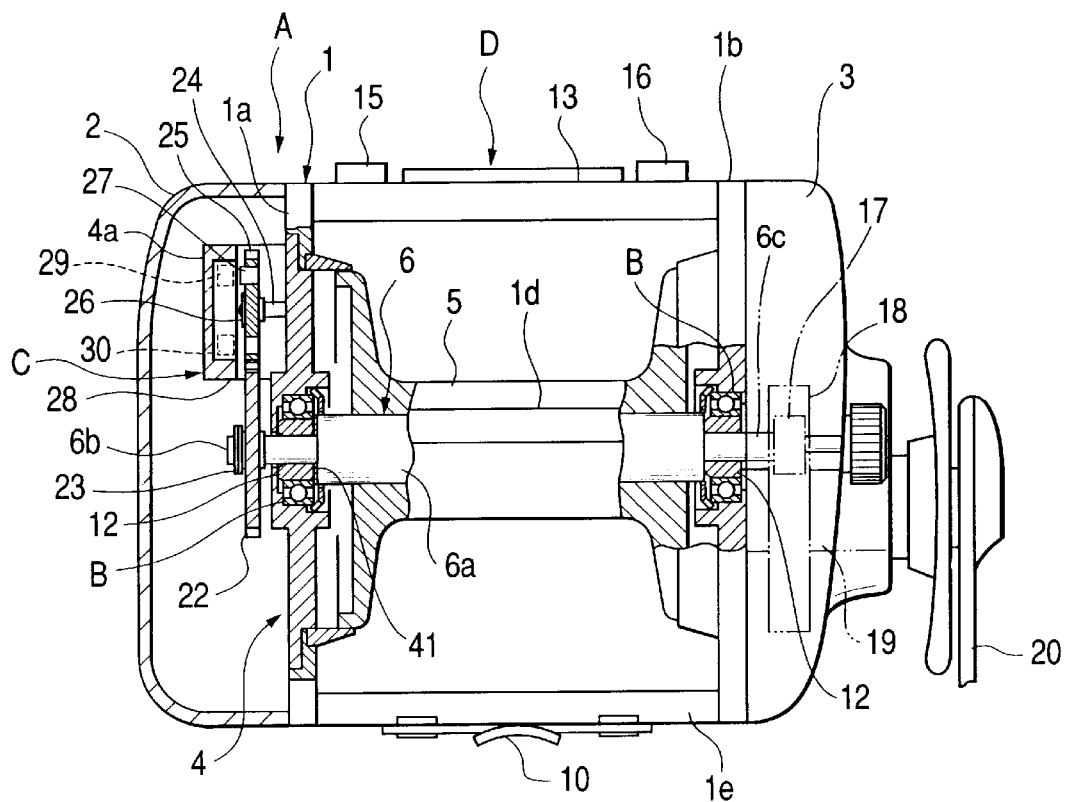
FIG. 5 is a partially sectional back view of the fishing reel according to the first embodiment.

In FIG. 3, the electric figure display portion 7 is formed of an LCD, in which three sets of ten segments 7a, 7b, 7c, 7d, 7e, 7f, 7g, 7h, 7i, and 7j are respectively able to display the display values of three figures, α, β, γ and the display value positions thereof can be changed each time the display is switched.

Between the display values α, β, γ, shown in FIG. 3, there are provided decimal point marks "." 7k, 7m, 7n, 7o.

Figure 2:
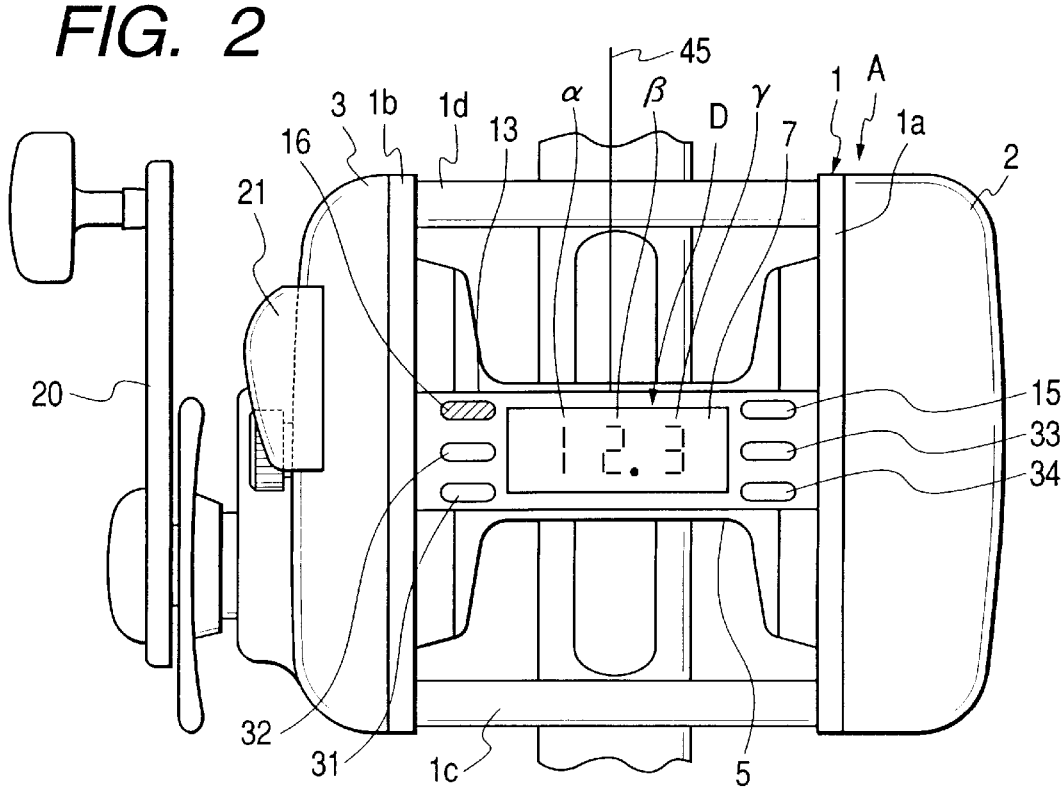
FIG. 2 is a plan view of a fishing reel of a left handle type according to the first embodiment of the invention.

Here, FIG. 1, and FIGS. 4A and 4B respectively show a display state obtained when the fishing reel is used as a right handle type reel and, on the other hand, FIG. 2, and FIGS. 4C and 4D respectively show a display state when the fishing reel is used as a left handle type reel.

In FIG. 1, on the side of the display device D that is opposite to the handle (namely, on the counter-handle side of the display Device D), there is provided a switch button 15 used to switch the display switching unit 8 when the fishing reel is used as a right handle type reel; and, on the handle side of the display device D, there is provided a switch button 16 used to switch the display switching unit 8 when the fishing reel is used as a left handle type reel.

In FIG. 4B, as the display values α, β, γ, "1, 2, 3" are displayed by the two segments 7a, 7b, five segments 7b, 7c, 7d, 7e, 7f, and five segments 7a, 7b, 7c, 7d, 7e, respectively.

Also, in FIG. 4E, there is displayed the decimal point mark "." 7n.

In FIG. 4E, the switch button 15 for switching the display switching unit 8 when the fishing reel is used as a right handle type reel is pressed down, and "1, 2, 3" of the display values α, β, γ, are displayed by the two segments 7c, 7h, five segments 7a, 7c, 7f, 7i, 7j, and five segments 7a, 7c, 7f, 7h, 7j, respectively.

Also, in FIG. 4E, there is displayed the decimal point mark "." 7k.

In FIG. 4F, the switch button 15 for switching the display switching unit 8 when the fishing reel is used as a right handle type reel is pressed down, and "1, 2, 3" of the display values α, β, γ are displayed by the two segments 7d, 7i, five segments 7a, 7c, 7f, 7i, 7j, and five segments 7a, 7d, 7f, 7i, 7j, respectively.

Also, in FIG. 4F, there is displayed the decimal point mark "." 7o.

In FIG. 4D, "1, 2, 3" of the display values α, β, γ are displayed by the two segments 7f, 7g, five segments 7c, 7f, 7d, 7b, 7e, and five segments 7c, 7f, 7d, 7g, 7e, respectively.

Also, in FIG. 4D, there is displayed the decimal point mark "." 7m.

In FIG. 4G, the switch button 16 for switching the display switching unit 8 when the fishing reel is used as a left handle type reel is pressed down, and "1, 2, 3" of the display values α, β, γ are displayed by the two segments 7d, 7i, five segments 7a, 7c, 7f, 7i, 7j, and five segments 7a, 7d, 7f, 7i, 7j, respectively.

Also, in FIG. 4G, there is displayed the decimal point mark "." 7o.

In FIG. 4H, the switch button 16 for switching the display switching unit 8 when the fishing reel is used as a left handle type reel is pressed down, and "1, 2, 3" of the display values α, β, γ are displayed by the two segments 7c, 7h, five segments 7a, 7c, 7f, 7i, 7j, and five segments 7a, 7c, 7f, 7h, 7j, respectively.

Also, in FIG. 4H, there is displayed the decimal point mark "." 7k.

The spool 5 is fixed to the large diameter portion 6a of the spool shaft 6; and, the spool shaft 6 includes two small diameter portions 6b and 6c respectively formed on the two sides thereof, while the two small diameter portions 6b and 6c are supported by their respective solid bearings 12 and ball bearings B, respectively.

A pinion 17 is fitted with the outer periphery of the small diameter portion 6c of the spool shaft 6 within the reel side plate 3 in such a manner that it can be freely moved in the axial direction of the spool shaft 6, while the pinion 17 is also in meshing engagement with a drive gear 18.

The spool 5 is structured such that it can be rotated through a clutch mechanism (not shown), the pinion 17 fitted with the spool shaft 6, the drive gear 18 frictionally connected to a handle shaft 19, and a handle 20 mounted on the handle shaft 19.

The clutch mechanism (not shown) is provided between the spool shaft 6 and pinion 17 and can be operated on or off by means of operation of a clutch operation lever 21.

A gear 22 is fitted with the small diameter portion 6b of the spool shaft 6 projected outwardly of the side frame section 1a, while an E ring 23 is used to prevent the gear 22 against removal.

A rotary member 25 consisting of a gear included in the measuring instrument C is rotatably supported by a bearing 24 which is fixed to the support plate 4, while an E ring 26 is used to prevent the rotary member 24 against removal.

The rotary member 25 consisting of a gear is in meshing engagement with the gear 22.

A signal issuing magnet 27 and a balancer 28 are respectively embedded in the rotary member 25 consisting of a gear.

The support plate 4 includes a projecting portion 4a which is provided on and projected from the outside thereof.

In the positions of the projecting portion 4a which are opposed to the signal issuing magnet 27, there are arranged the magnetic sensors of the measuring instrument C such as hall elements 29 and 30, or the like.

The above-mentioned display device D, display switching unit 8, gear 22, rotary member 25, signal issuing magnet 27, and hall elements 29, 30 cooperate together in constituting the measuring instrument C.

On the hold member 13, there are provided a plurality of operation buttons 31, 32, 33, 34 for their respective functional switches in such a manner that they are arranged on the left and right sides of the display device D.

The hall element 29 which is the magnetic sensor of the measuring instrument C is connected to a fishing line operation circuit 35 and a take-up/play-out judging circuit 36 which are respectively shown in FIG. 8, whereas the hall element 30 is connected to the take-up/play-out judging circuit 36.

Further, the display device D, a plurality of switches 31, 32, 33, 34, a power supply battery 37, the fishing line length operation circuit 35, the take-up/play-out judging circuit 36, memory unit 38, and comparison unit 39 are respectively connected through the display switching unit 8 to a control circuit 14 which is shown in FIG. 8 and consists of the CPU of the measuring instrument C.

Referring to the functions of the plurality of functional switches and operation buttons which are given the same designations, for example, the switch 31 and switch operation button 31 can be used to turn on or off a power supply, the switch 32 and switch operation button 32 can be used for resetting, the switch 33 and switch operation button 33 can be used to gain access to a shelf memory, the switch 34 and switch operation button 34 can be used to display a tensile force, and so on.

The fishing line length operation circuit 35 is a circuit which allows the hall element 29 to detect the rotation of the rotary member 25 with the signal issuing magnet 27 of the measuring instrument C fixed thereof, and, in accordance with a rotation number signal, converts the rotation of the rotary member 25 into a fishing line length value.

The take-up/play-out judging circuit 36 is a circuit which judges the rotation direction of the rotary member 25. In other words, the take-up/play-out judging circuit 36 is structured such that it judges whether the fishing line is to be played out or to be taken up in accordance with whether the signal issuing magnet 27 is detected in the forward direction or in the reverse direction of the signals of the hall elements 29 and 30.

The small diameter portions 6b and 6c of the spool shaft 6 are respectively fitted with and carried by their respective solid bearings 12, while the solid bearings 12 are respectively fitted with and fixed to the inner races 40 of the ball bearings B.

A washer 41 is inserted between the end portion of the large diameter portion 6a of the spool shaft 6 and the solid bearing 12, inner race 40.

The ball bearing B is composed of the inner race 40, a plurality of balls 42, two seal members 43, 43 respectively provided on the two sides of the ball bearing B, and oil 44.

To replace a right handle type spool 5 with a left handle type spool 5, the reel side plate 2 may be removed, the screw 11 may be then loosened, and the support plate 4 may be removed, so that the replacement of the spool 5 can be achieved.

Referring now to the operation of the present fishing reel, if the handle 20 is rotated in a direction in which a fishing line 45 is wound around the spool 5 in FIGS. 1 and 2, then the spool shaft 6 is rotated forwardly through the handle shaft 19, drive gear 18 and pinion 17, so that the fishing line 45 can be taken up onto the spool 5.

Figure 6:
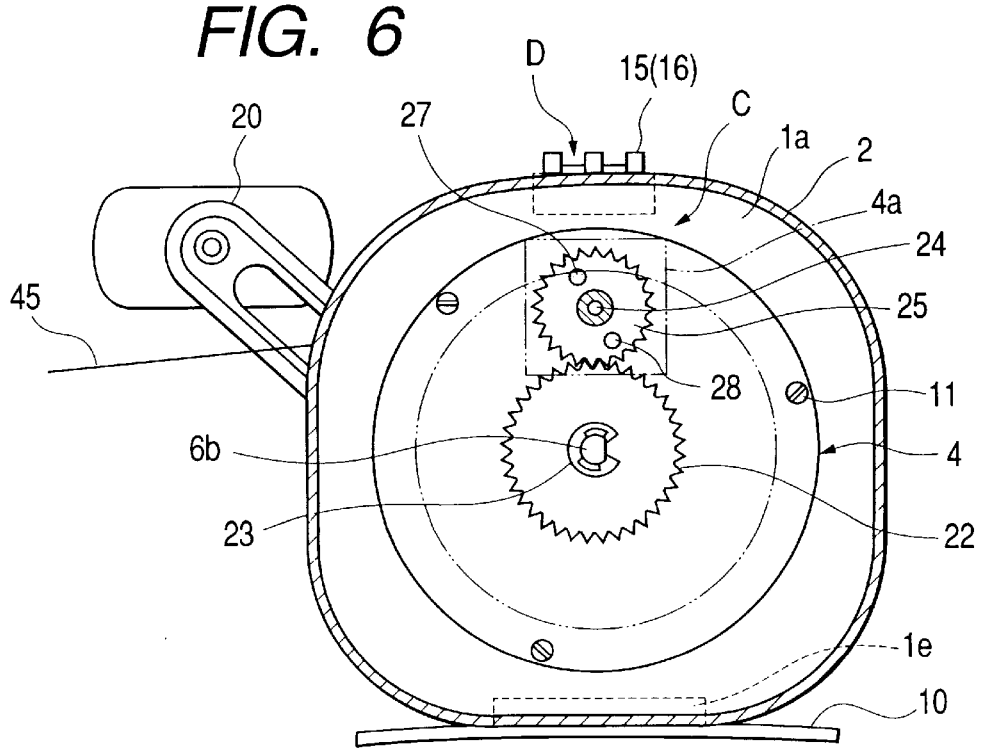
FIG. 6 is an enlarged sectional side view of a reel side plate located on the opposite side of a handle employed in the first embodiment.
Figure 7:
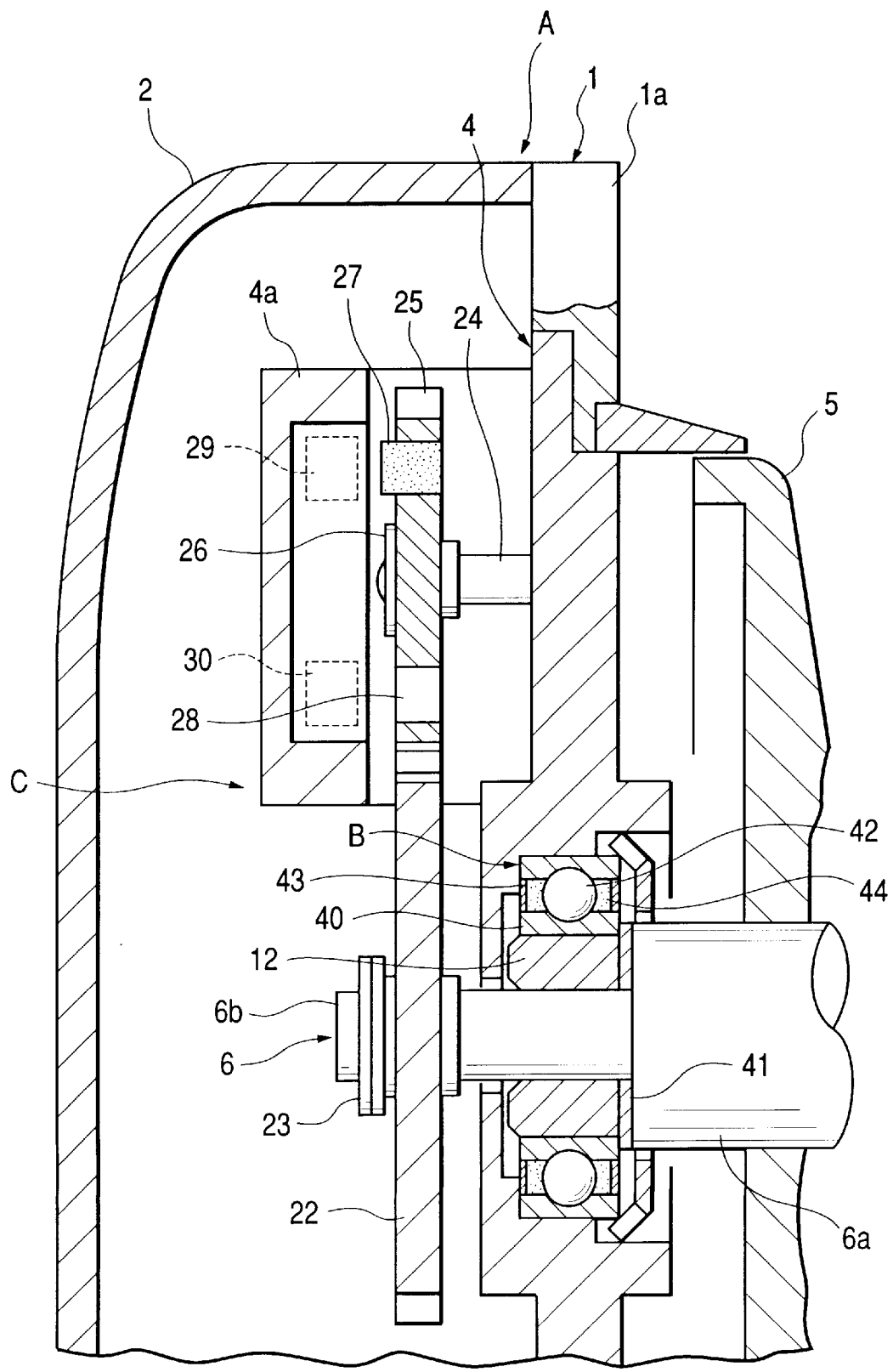
FIG. 7 is a partially enlarged sectional back view of FIG. 5.

If the spool 5 is rotated forwardly, then the signal issuing magnet 27 is rotated clockwise in FIG. 6, the number of rotations of the spool 5 is detected by the hall element 29, the thus detected number of rotations is converted to a fishing line length value by the fishing line length operation circuit 35, and the thus converted fishing line length value is then displayed numerically on the electric figure display portion 7 of the display device D.

Further, when the above detection starts at either of the hall element 29 or 30, if the detection is in the forward direction of the detect signal of the hall element, then the take-up/play-out judging circuit 36 outputs a fishing line play-out signal; and, on the other hand, if the detection is in the reverse direction of the signal, then the take-up/play-out judging circuit 36 outputs a fishing line take-up signal.

Next, if the clutch mechanism is turned off and thus the terminal tackles (not shown) of the clutch mechanism are lowered down to a shelf position through the operation of the clutch operation lever 21, then the spool 5 is rotated reversely due to the play-out operation of the fishing line 45 so that the fishing line 45 can be played out.

If the signal issuing magnet 27 is rotated reversely, then the number of rotations of the spool 5 is detected by the hall element 29, the thus detected number is converted to a fishing line length value, and the thus converted fishing line length value is displayed by the display device D, so that the rotation direction of the spool 5 can be detected by the hall elements 29 and 30.

To store the fishing line length value at the shelf position, if the switch operation button 33 of the shelf memory is pressed down, then the switch 33 is turned on so that the fishing line length value can be stored in the memory unit 38.

If the fishing line 45 is played out, then an actually measured fishing line length value during angling is input to the comparison unit 39; and, if the fishing line length value stored in the memory unit 38 is coincident with the actually measured fishing line length value during angling, then a coincidence signal is input to the control circuit 14 from the comparison unit 39. In this case, if an alarm is provided, then the alarm tells such coincidence.

When the fishing line 45 wound around the spool 5 is played out due to the terminal tackles (not shown), or when the spool 5 and spool shaft 6 are rotated under a light load in the off state of the clutch mechanism, the small diameter portions 6b and 6c are rotated within their respective solid bearings 12.

When a fish is caught and thus the fishing line 45 is wound around the spool 5 under a high load, the small diameter portions 6b and 6c are pressed against the inner surfaces of their respective solid bearings 12, so that the small diameter portions 6b and 6c, solid bearings 12 and inner races 40 are rotated integrally.

If the spool shaft 6 is carried by the solid bearings 12 and ball bearings B, then water is difficult to penetrate into the reel side plate 2 or 3 from the spool 5 side.

By operating the switch buttons 15 and 16 of the display switching unit 8, as described above, the display values $\alpha$, $\beta$, $\gamma$ can be displayed not only in such a manner that they can be made to correspond to the left or right handle and thus are easy to see from front, but also in such a manner that they are easy to see from the lateral direction thereof.

If a fishing reel is structured in the above-mentioned manner, then the display direction of the display values $\alpha$, $\beta$, $\gamma$ within the display device D of the measuring instrument C can be changed, that is, the display values $\alpha$, $\beta$, $\gamma$ can be changed to a display direction which corresponds to the angler's looking direction and is thus easy to see, such as a back-and-forth direction, a right-and-left direction, and the like during an actual angling operation. This improves the visual confirmation of the fishing line length and the like.

Also, even if the direction of the reel main body A is reversed right or left according to whether the fishing reel is used as a left handle reel or a right handle reel, since the display direction of the display values $\alpha$, $\beta$, $\gamma$ can be changed, the display values are easy to see with no trouble regardless of the directions of the handle 20, thereby being able to enhance the efficiency of a fishing operation.

Further, even if a fishing reel is manufactured according to the specification that is applied to one of the right and left handles, by operating the switch buttons 15 and 16 of the display switching unit 8, the thus manufactured fishing reel is also able to cope with the specification of the other handle, which makes it possible to reduce the manufacturing cost of the fishing reel.

In the above description, the electric figure display portion 7 is formed of an LCD. However, this is not limitative but, for example, the electric figure display portion 7 may also be formed of an LED, the LED may be formed in segments, and one segment may be formed of a plurality of points or may be formed of a plurality of points which are arranged vertically and horizontally at regular intervals.

Figure 9A:
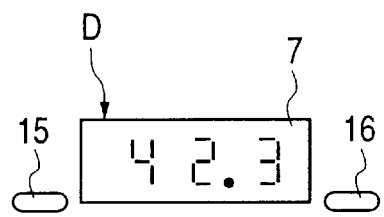
FIGS. 9A and 9B show a second embodiment of a fishing reel according to the invention; and are explanatory views of an electric figure display portion provided within a display device, showing how to change the electric figure display portion.
Figure 9B:
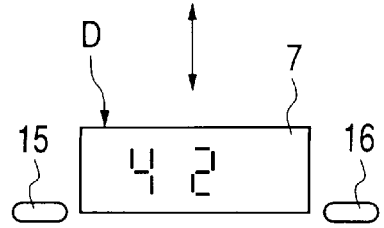

Now, FIGS. 9A and 9B show a second embodiment of a fishing reel according to the invention; and, FIG. 9A and 9B are explanatory views of an electric figure display portion provided within a display device employed in the second embodiment, showing how to change the electric figure display portion.

In the second embodiment, the electric figure display portion 7 of the display device D is structured in such a manner that, for example, when the number of rotations of the spool shaft 6 is 1.2 m/s or less, as shown in FIG. 9A, it displays a display value (42.3 m) including a decimal; and, when the number of rotations is larger than 1.2 m/s, as shown in FIG. 9B, it displays a display value (42 m) with the decimal thereof omitted.

If the figures after the decimal point of the display values are displayed as in the conventional display device, then the display values are displayed flickeringly at a high-speed rotation so that they cannot be recognized accurately. However, if the display device is structured in such a manner as shown in the second embodiment, then such drawback or flickering display can be eliminated.

The remaining portions of the structure of the second embodiment are substantially the same as those of the first embodiment.

Figure 10:
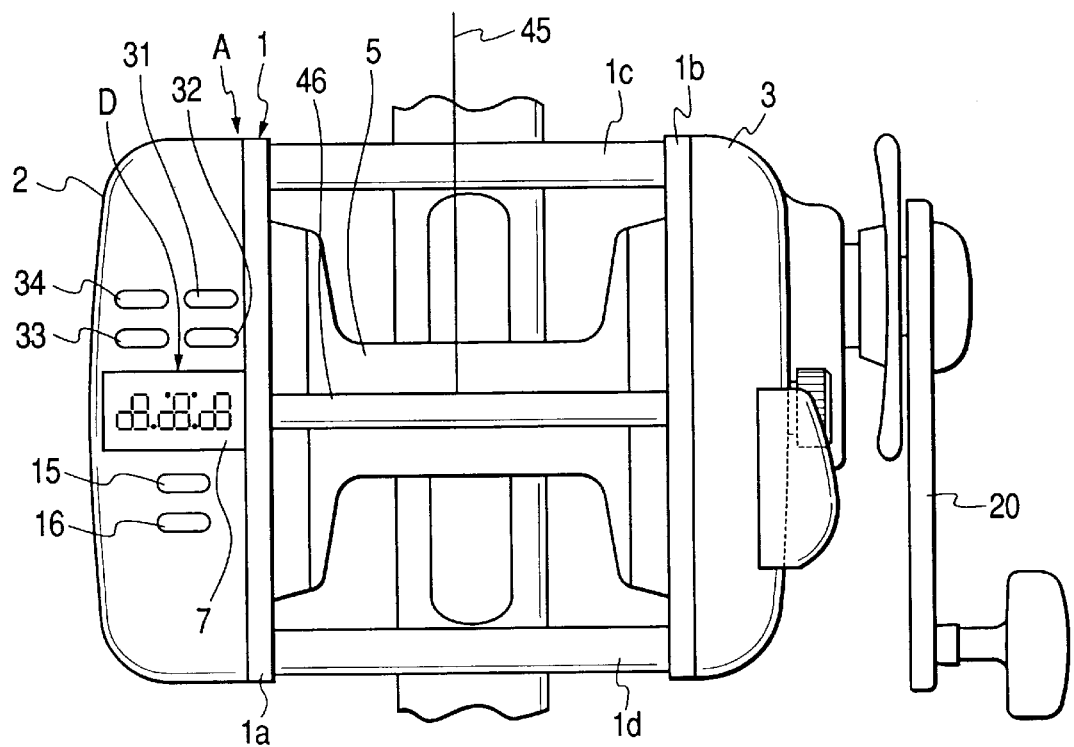
FIG. 10 is a plan view of a fishing reel which is used as a right handle reel according to a third embodiment of the invention, showing a state thereof when a figure display thereof is stopped.
Figure 11:
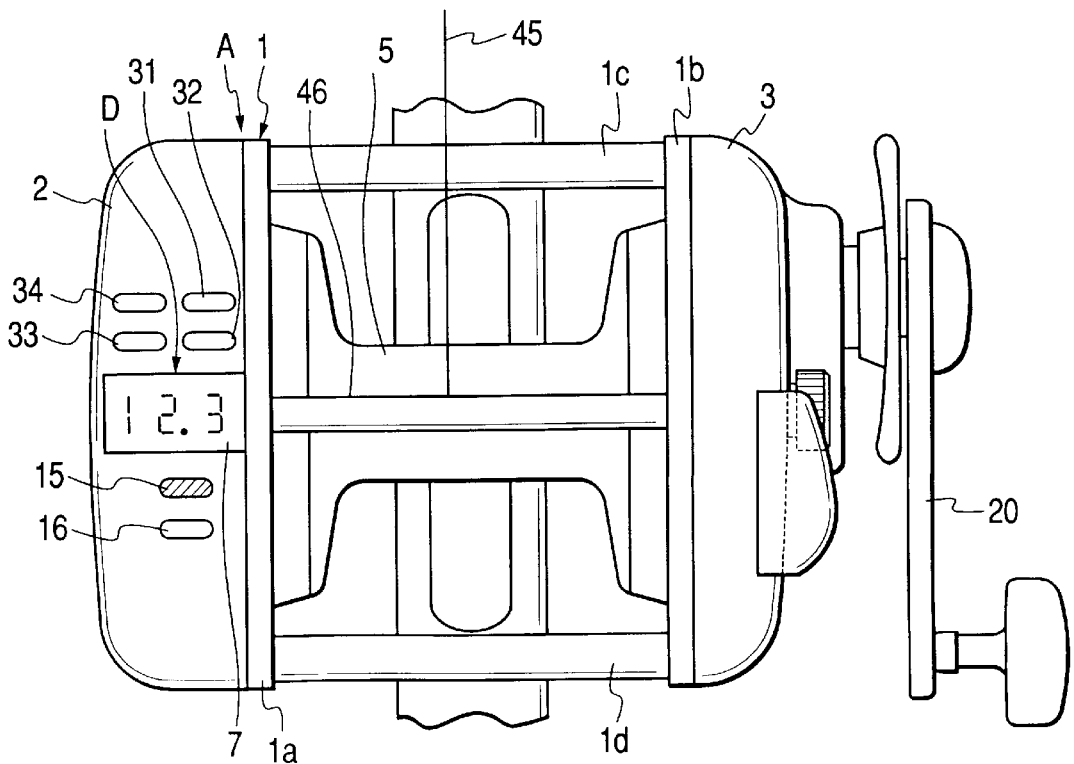
FIG. 11 is an another plan view of the fishing reel according to the third embodiment, which is used as a right handle reel.
Figure 12:
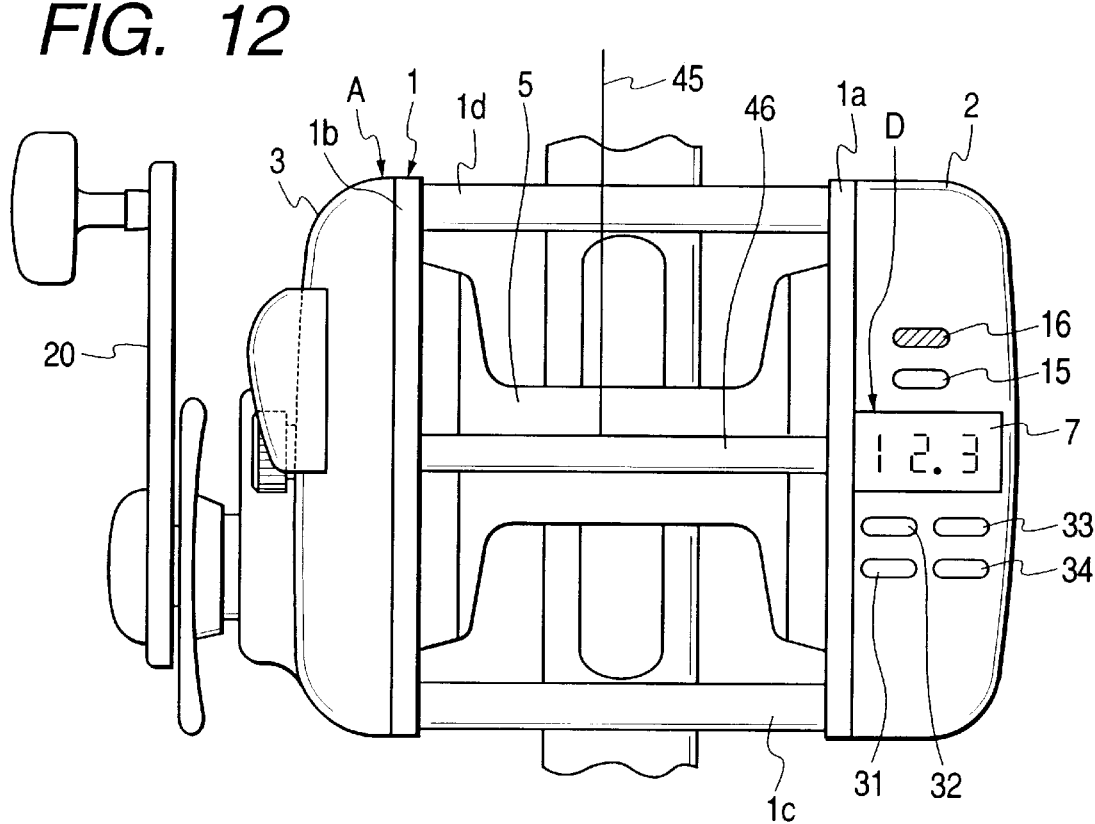
FIG. 12 is a plan view of a fishing reel according to the third embodiment, which is used as a left handle reel.

Now, FIGS. 10 to 12 show a third embodiment of a fishing reel according to the invention. In particular, FIG. 10 is a plan view of a fishing reel according to the third embodiment, which is used as a right handle reel, showing a state thereof when a figure display thereof is stopped; FIG. 11 is another plan view of the fishing reel according to the third embodiment, which is used as a right handle reel; and, FIG. 12 is a plan view of a fishing reel according to the third embodiment, which is used as a left handle reel.

According to the third embodiment, the display device D of the measuring instrument C is disposed on the upper portion of the reel side plate 2.

The electric figure display portion 7 within the display device D is arranged in the axial direction of the spool 5.

In FIG. 10, on the rear side of the display device D, there are provided two switch buttons 15 and 16 which are the components of the display switching unit 8; and, on the front side of the display device D, there are provided a plurality of operation buttons 31, 32, 33, 34 which can be used to operate their respective functional switches.

At the position of the hold member 13 according to the first embodiment disposed on the upper portion of the spool 5 between the left and right side frame sections 1a and 1b, there is provided a pillar 46.

The remaining portions of the structure of the present or third embodiment are substantially the same as those of the first embodiment.

Now, FIGS. 13 to 16H show a fourth embodiment of a fishing reel according to the invention.

According to the fourth embodiment, the display device D of the measuring instrument C is disposed on the upper portion of the reel side plate 2.

The electric figure display portion 7 within the display device D is arranged long in a play-out direction where the fishing line 45 is played out from the spool 5.

Figure 14:
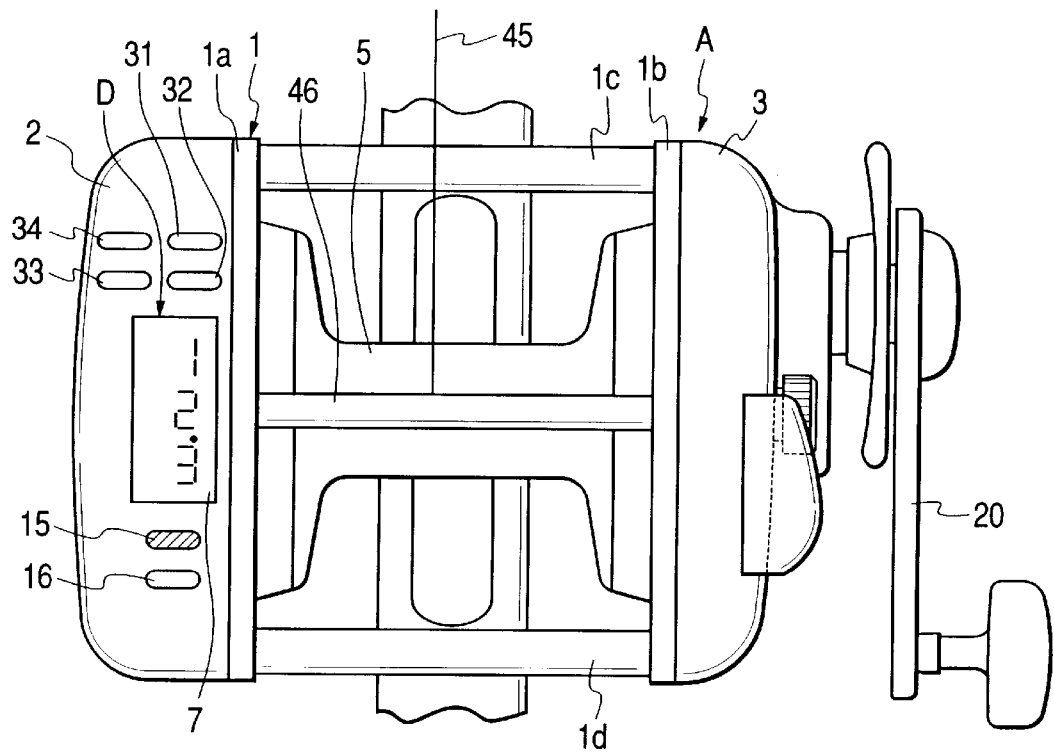
FIG. 14 is an another plan view of the fishing reel according to the fourth embodiment, which is used as a right handle reel.
Figure 15:
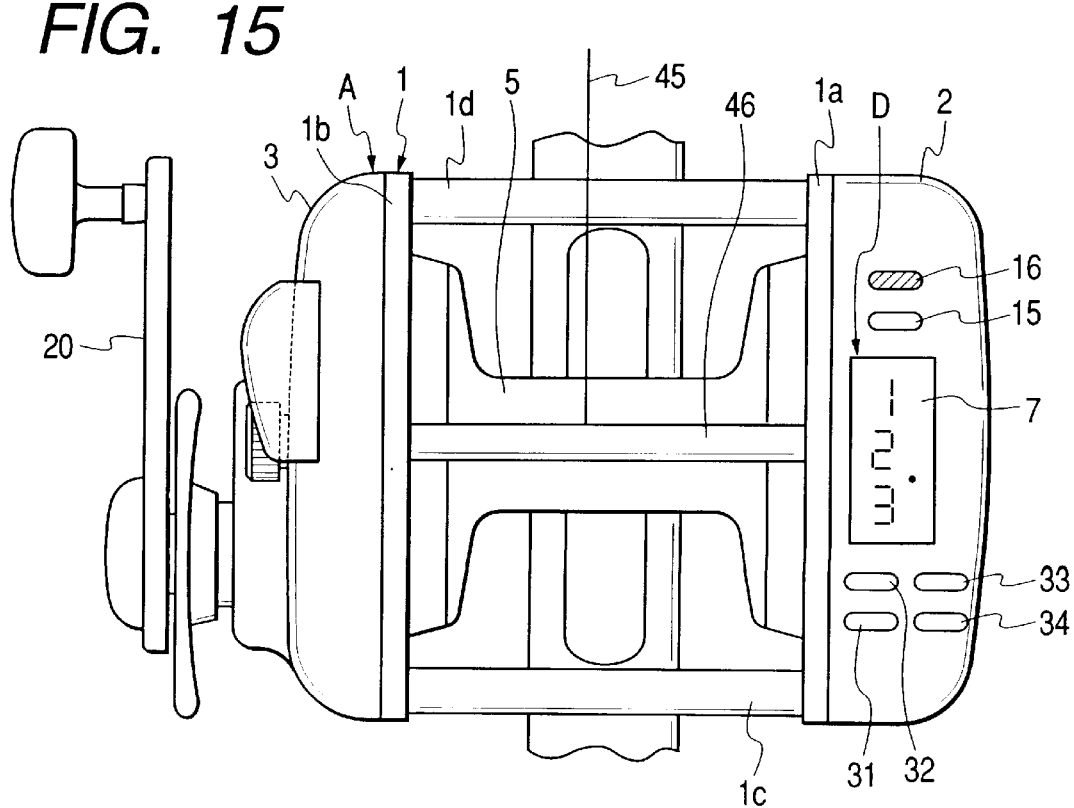
FIG. 15 is a plan view of a fishing reel according to the fourth embodiment, which is used as a left handle reel.
Figures 16C, 16E, 16F:
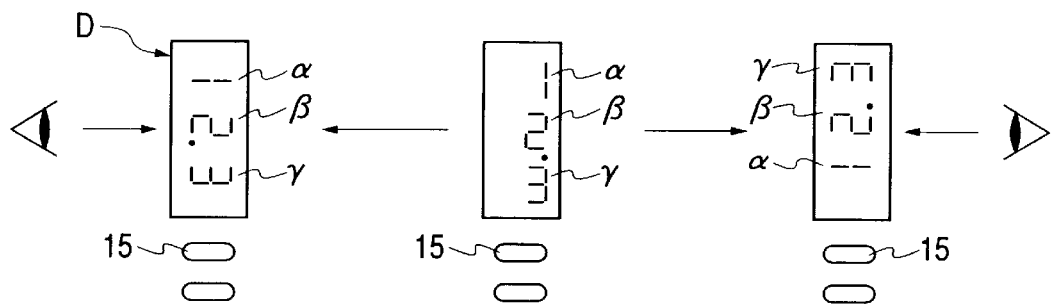
FIGS. 16A to 16H are explanatory views of an electric figure display portion within a display device employed in the fourth embodiment, showing how to change the display of the electric figure display portion.
Figures 16A, 16B:
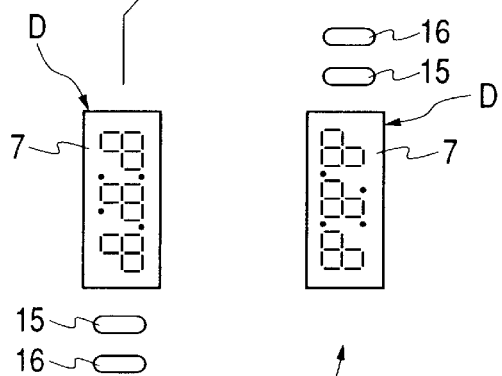
Figures 16D, 16G, 16H:
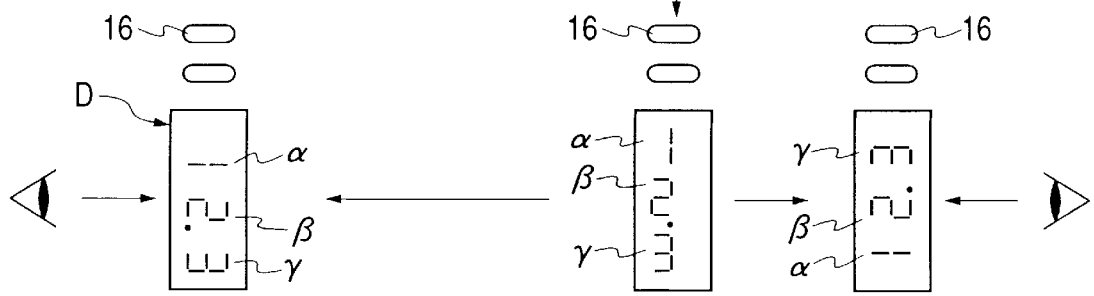

In particular, FIGS. 14 and 16A and 16C respectively show the display state of the electric figure display portion 7 when the fishing reel is used as a right handle reel; and, FIGS. 15 and 16B and 16D respectively show display state of the electric figure display portion 7 when the fishing reel is used as a left handle reel.

The remaining portions of the fourth embodiment are substantially the same as those of the previously described first embodiment.

In FIG. 16C, referring to display values $\alpha$, $\beta$, $\gamma$, "1, 2, 3" thereof are arranged in the same manner as those shown in FIG. 3 and, in particular, they are displayed by two segments 7c, 7h, five segments 7a, 7c, 7f, 7i, 7j, and five segments 7a, 7c, 7f, 7h, 7j, respectively.

Also, in FIG. 16C, there is displayed a decimal point mark "." 7k.

In FIG. 16E, the switch button 15 of the display switching unit 8 for the right handle reel is pressed down and "1, 2, 3" of the display values $\alpha$, $\beta$, $\gamma$ are displayed by two segments 7f, 7g, five segments 7c, 7f, 7d, 7b, 7e, and five segments 7c, 7f, 7d, 7g, 7e, respectively.

Also, in FIG. 16E, there is displayed a decimal point mark "." 7m.

In FIG. 16F, the switch button 15 of the display switching unit 8 for the right handle reel is pressed down and "1, 2, 3" of the display values $\alpha$, $\beta$, $\gamma$ are displayed by two segments 7a, 7b, five segments 7b, 7c, 7d, 7e, 7f, and five segments 7a, 7b, 7c, 7d, 7e, respectively.

Also, in FIG. 16F, there is displayed a decimal point mark "." 7n.

In FIG. 16D, "1, 2, 3" of the display values $\alpha$, $\beta$, $\gamma$ are displayed by two segments 7d, 7i, five segments 7a, 7c, 7f, 7i, 7j, and five segments 7a, 7d, 7f, 7i, 7j, respectively.

Also, in FIG. 16D, there is displayed a decimal point mark "." 7o.

In FIG. 16G, the switch button 16 of the display switching unit 8 for the right handle reel is pressed down and "1, 2, 3" of the display values α, β, γ are displayed by two segments 7a, 7b, five segments 7b, 7c, 7d, 7e, 7f, and five segments 7a, 7b, 7c, 7d, 7e, respectively.

Also, in FIG. 16G, there is displayed a decimal point mark "." 7n.

In FIG. 16H, the switch button 16 of the display switching unit 8 for the right handle reel is pressed down and "1, 2, 3" of the display values α, β, γ are displayed by two segments 7f, 7g, five segments 7c, 7f, 7d, 7b, 7e, and five segments 7c, 7f, 7d, 7g, 7e, respectively.

Also, in FIG. 16H, there is displayed a decimal point mark "." 7m.

Figure 17:
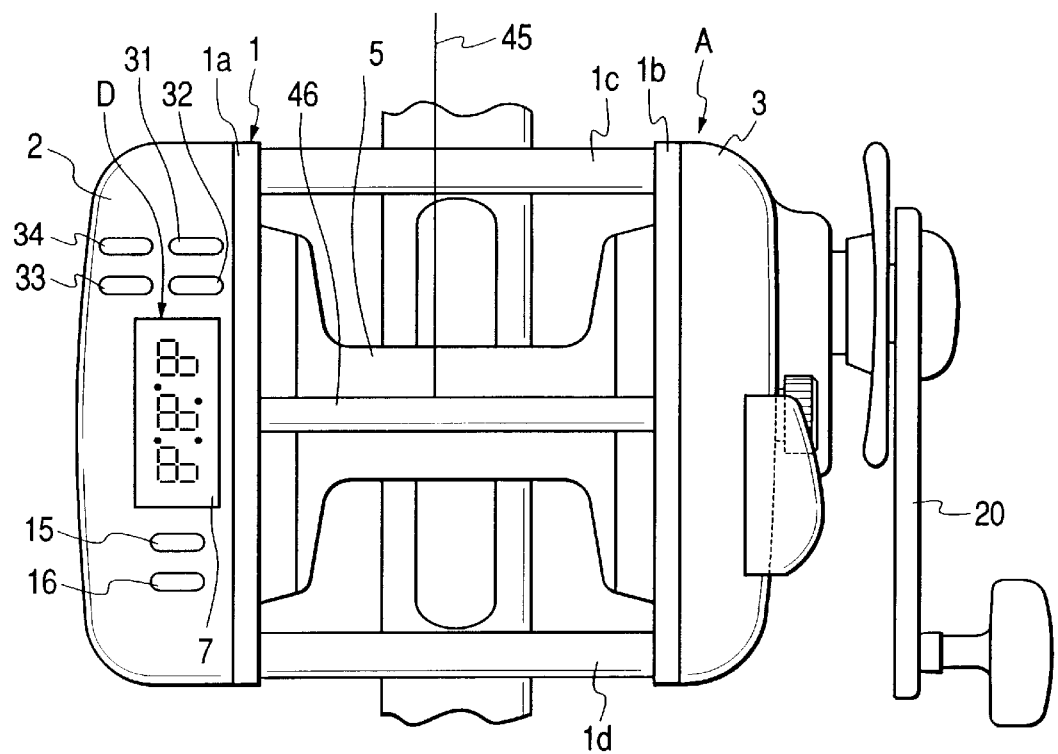
FIG. 17 is a plan view of a fishing reel according to a fifth embodiment, which is used as a right handle reel, showing a state thereof when the figure display thereof is stopped.
Figure 18:
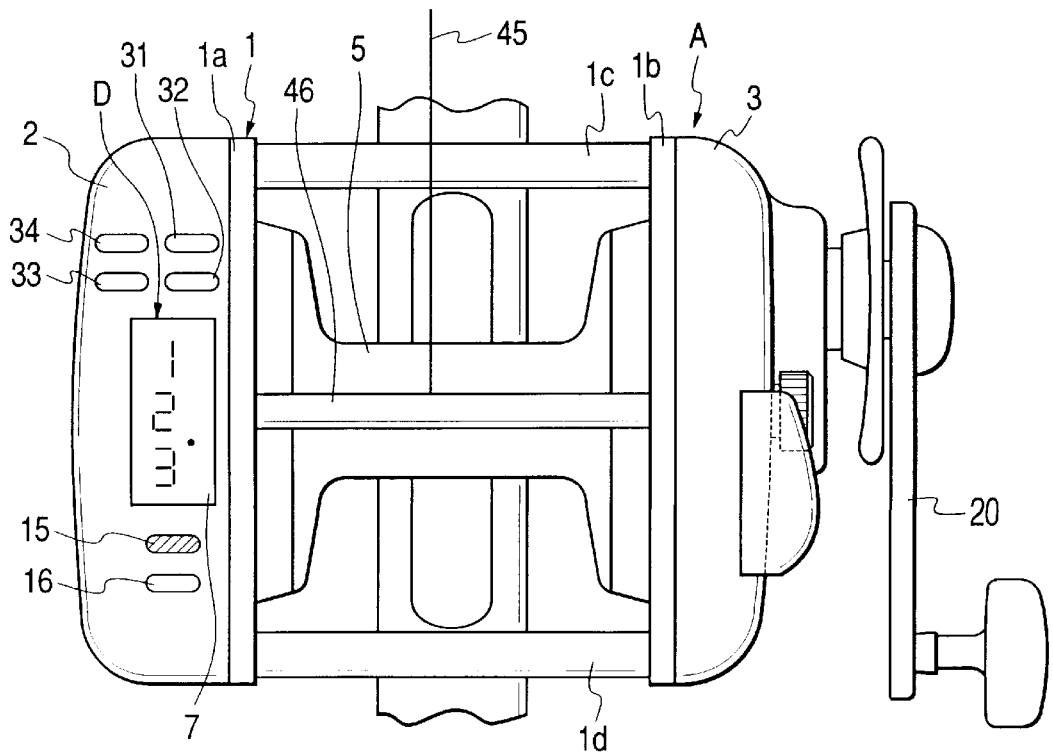
FIG. 18 is an another plan view of the fishing reel according to the fifth embodiment, which is used as a right handle reel.
Figure 19:
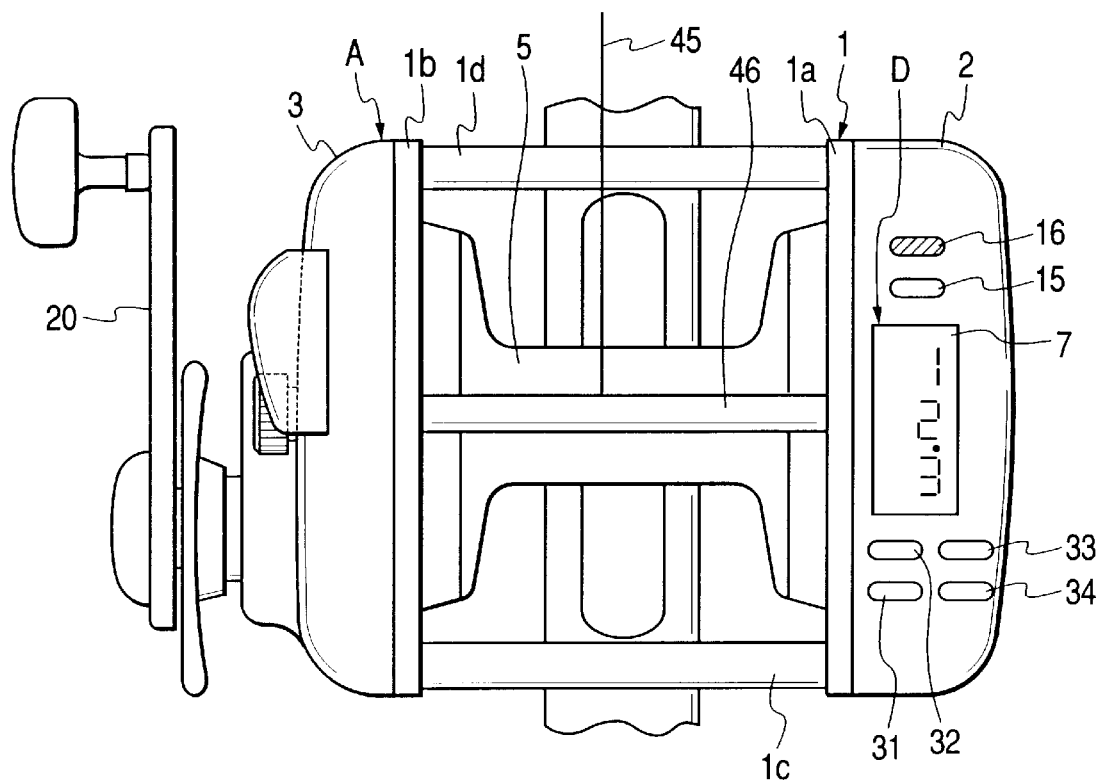
FIG. 19 is a plan view of the fishing reel according to the fifth embodiment, which is used as a left handle reel.

Now, FIGS. 17 to 19 respectively show a fifth embodiment of a fishing reel according to the invention.

Figure 13:
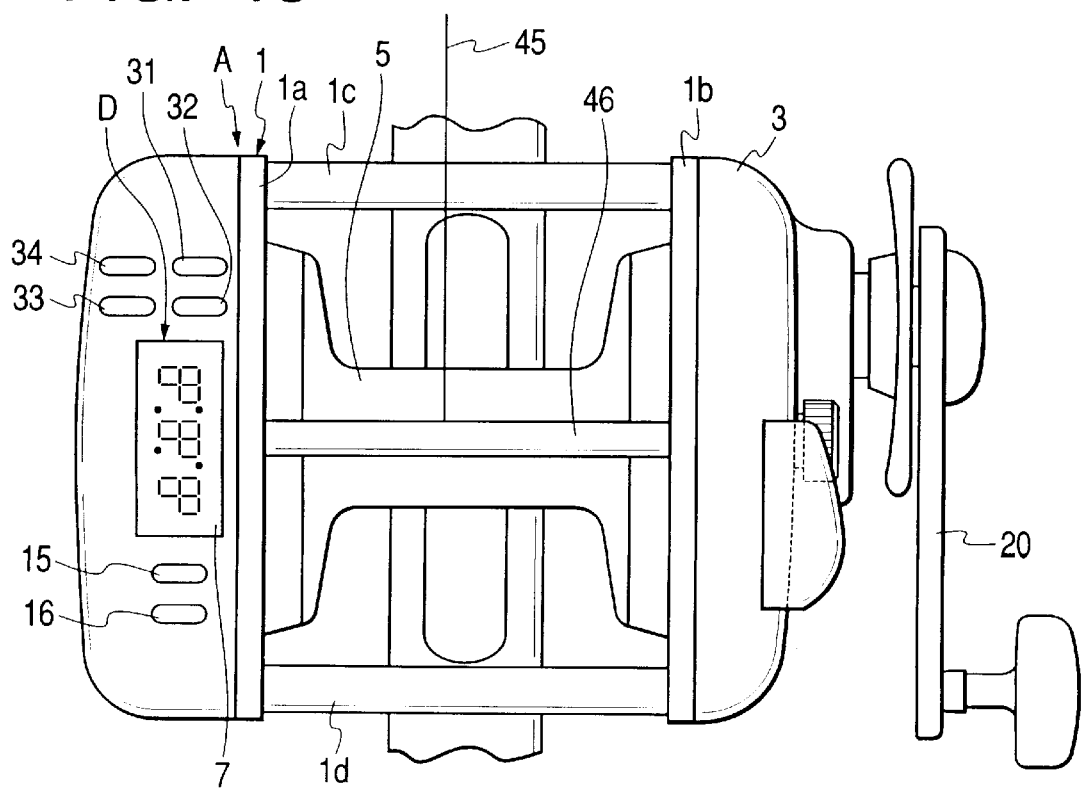
FIG. 13 is a plan view of a fishing reel according to a fourth embodiment, which is used as a right handle reel, showing a state thereof when a figure display thereof is stopped.

In the fifth embodiment, a variance of the embodiment of FIGS. 13–15, the display device D of the measuring instrument C is disposed on the upper portion of the reel side plate 2.

The electric figure display portion 7 within the display device D is arranged long in a play-out direction where the fishing line 45 is played out from the spool 5.

Also, the electric figure display portion 7 is arranged that it is turned upside down with respect to the previously described fourth embodiment.

In FIGS. 17 and 18, there is shown the display state of the display device D when the fishing reel is used as a right handle reel, and, in FIG. 19, there is shown the display state of the display device D when the fishing reel is used as a left handle reel.

The remaining portions of the fifth embodiment are substantially the same as those of the previously described first embodiment.

Figure 20:
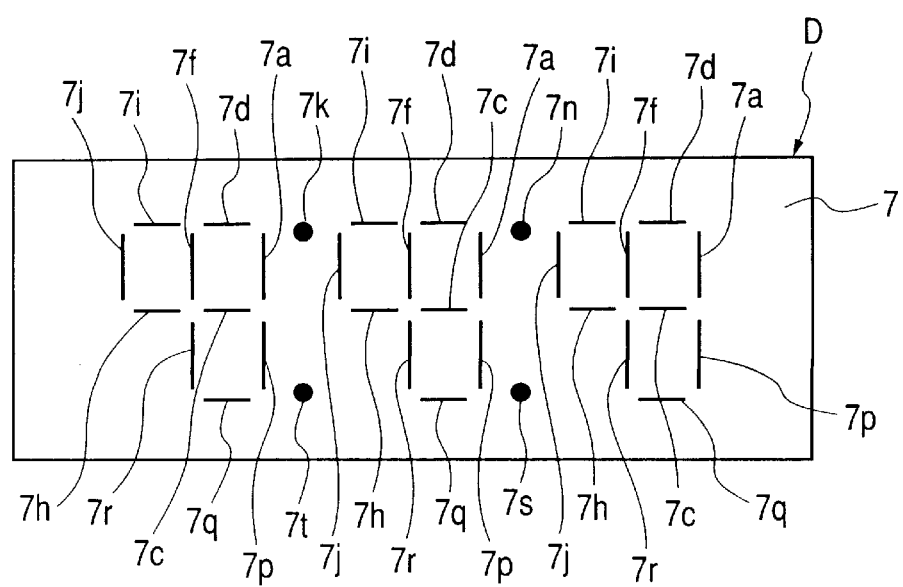
FIG. 20 is an enlarged plan view of a plurality of segments which are used to display electric figure display values within a display device employed in a fishing reel according to a sixth embodiment of the invention.
Figure 21:
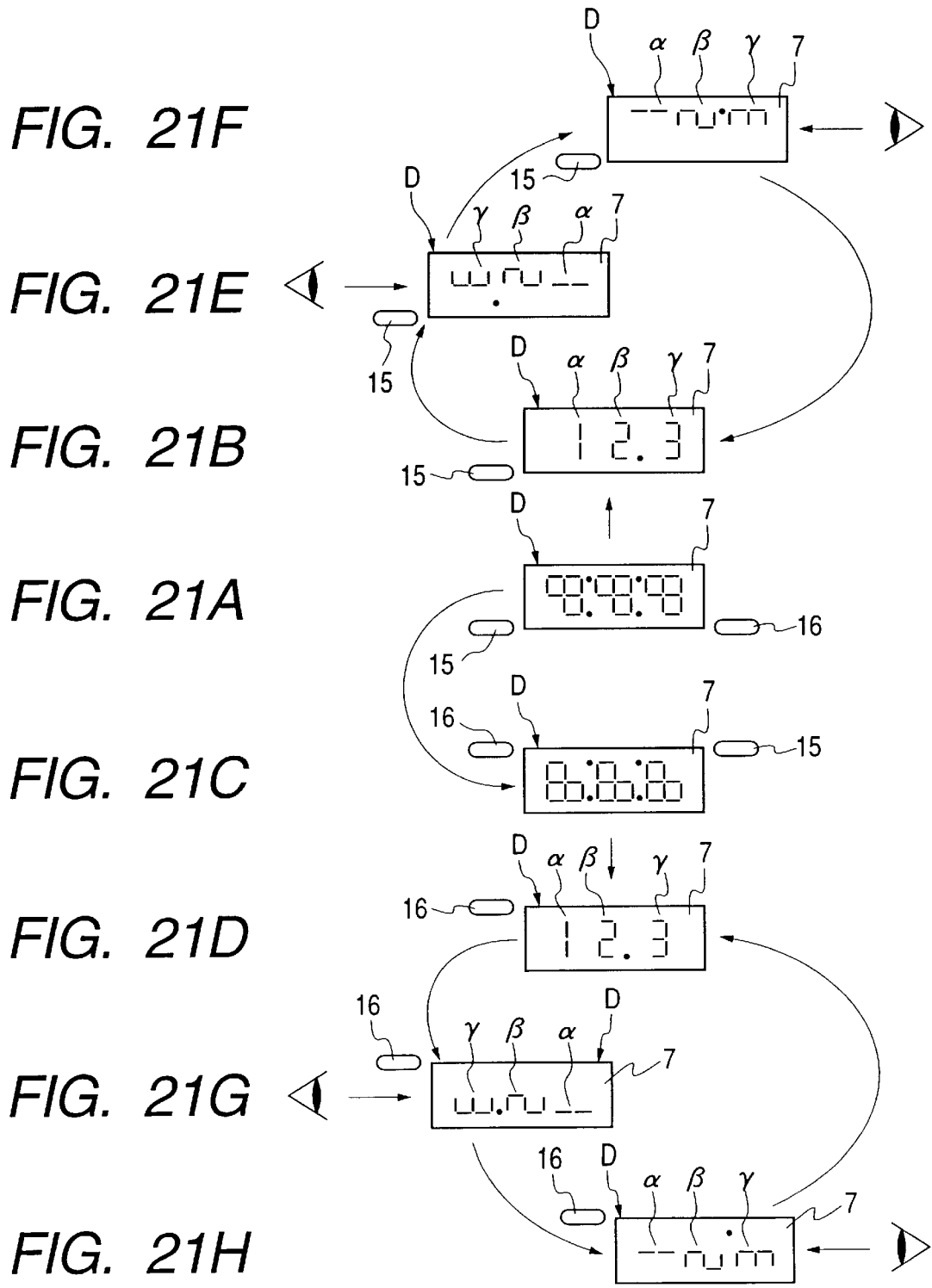
FIG. 21 is an explanatory view of an electric figure display portion provided within the display device employed in the six embodiment, showing how to change the display of the electric figure display portion.

Now, FIGS. 20 and 21 respectively show a sixth embodiment, a variation of the embodiment of FIGS. 4A–4H, of a fishing reel according to the invention. In particular, FIG. 20 is an enlarged plan view of a plurality of segments which are used to display electric figure display values within the display device according to the six embodiment; and, FIG. 21 is an explanatory view of the electric figure display portion within the present display device, showing how to change the display of the electric figure display portion.

According to the sixth embodiment, in the electric figure display portion 7' thereof, there are used seven segments 7a, 7c, 7d, 7f, 7h, 7i, 7j whereas the three segments 7b, 7e, 7g employed in the first embodiment are replaced with three segments 7p, 7q, 7r which are so arranged as to face downward.

Between the display values α, β, γ, there are provided decimal point marks "." 7k, 7n, 7s, 7t.

In FIGS. 21A and 21B, there is shown the display state of the present electric figure display portion 7' when the fishing reel is used as a right handle reel; and, in FIGS. 21C and 21D, there is shown the display state of the electric figure display portion 7' when the fishing reel is used as a left handle reel.

The remaining portions of the sixth embodiment are substantially the same as those of the previously described first embodiment.

In FIG. 21B, "1, 2, 3" of the display values α, β, γ are displayed by two segments 7a, 7p, five segments 7a, 7c, 7d, 7r, 7q, and five segments 7a, 7p, 7c, 7d, 7q, respectively.

Also, in FIG. 21B, there is displayed a decimal point mark "." 7s.

In FIG. 21E, the switch button 15 of the display switching unit 8 for the right handle reel is pressed down and "1, 2, 3" of the display values α, β, γ are displayed by two segments 7c, 7h, five segments 7a, 7c, 7f, 7i, 7j, and five segments 7a, 7c, 7f, 7h, 7j, respectively.

Also, in FIG. 21E, there is displayed a decimal point mark "." 7t.

In FIG. 21F, the switch button 15 of the display switching unit 8 for the right handle reel is pressed down and "1, 2, 3" of the display values α, β, γ are displayed by two segments 7i, 7d, five segments 7b, 7c, 7f, 7i, 7j, and five segments 7a, 7d, 7f, 7i, 7j, respectively.

Also, in FIG. 21F, there is displayed a decimal point mark "." 7n.

In FIG. 21D, the display values α, β, γ, that is, "1, 2, 3" are displayed by two segments 7f, 7r, five segments 7d, 7a, 7c, 7r, 7q, and five segments 7d, 7g, 7c, 7r, 7q, respectively.

Also, in FIG. 21D, there is displayed a decimal point mark "." 7k.

In FIG. 21G, the switch button 16 of the display switching unit 8 for the left handle reel is pressed down and the display values α, β, γ, that is, "1, 2, 3" are displayed by two segments 7d, 7i, five segments 7a, 7c, 7f, 7i, 7j, and five segments 7a, 7d, 7f, 7i, 7j, respectively.

Also, in FIG. 21G, there is displayed a decimal point mark "." 7n.

In FIG. 21H, the switch button 16 of the display switching unit 8 for the left handle reel is pressed down and the display values α, β, γ, that is, "1, 2, 3" are displayed by two segments 7c, 7h, five segments 7a, 7c, 7f, 7i, 7j, and five segments 7a, 7c, 7f, 7h, 7j, respectively.

Also, in FIG. 21H, there is displayed a decimal point mark "." 7t.

In the foregoing description, there is illustrated the measuring instrument C in which the signal issuing magnet 22 is embedded in the rotary member 25 consisting of a gear. However, this is not limitative but, for example, the signal issuing magnet 22 may be embedded in one side flange of the spool 5.

Also, the measuring instrument C may also be structured in a different manner.

Further, in the foregoing description, the two left and right side frames 1a and 1b of the side frame 1 of the reel main body A are held in parallel to and integrally with each other by the two finger placement plates 1c, 1d and the fixing plate 1e of the reel leg 10. However, this is not limitative but, for example, the two left and right side frames 1a and 1b may be produced separately from each other and, after then, they may be held in parallel to each other.

Moreover, in the foregoing description, the present invention applies to a fishing reel of a hand-operated type in which the spool 5 can be rotated by manually rotating the handle 20. However, the present invention can also apply to a fishing reel of an electrically operated type.

FIGS. 22 to 30 show a seventh embodiment of a fishing reel according to the invention.

The reel main body A of the fishing reel includes a side frame 101 and two reel side plates 102, 103 which are respectively mounted on the outside of the side frame 101.

The side frame 101 includes two right and left side frame sections 101a and 101b which are held in parallel to and integrally with each other by a rear finger placement plate 101c, a fixing plate 1d of a reel leg 110, and a hollow pillar 111.

The reel side plate 102 is mounted on the outside of the left side frame section 101a.

The reel side plate 103 is mounted on the outside of the right side frame section 101b.

A spool 104 is interposed between the left and right side frame sections 101a and 101b in such a manner that the spool 104 is fixed to a spool shaft 105, while the spool shaft 105 is rotatably supported by one bearing (not shown) disposed on the left side frame section 101a as well as by the other bearing (not shown) disposed on the right side frame section 101b.

The spool 104 is composed of a fishing line winding barrel portion 104a around which a fishing line 112 can be wound, and two flange portions 104b and 104c respectively provided on the two sides of the fishing line winding barrel portion 104a.

The spool shaft 105 includes two small diameter portions 105a and 105b respectively located on the two sides thereof.

A pinion 113 can be fitted with the outer periphery of the small diameter portion 105a of the spool shaft 105 within the reel side plate 103 in such a manner that it can be freely moved in the axial direction of the spool shaft 105, while the pinion 113 is also in meshing engagement with a drive gear 114.

The spool 104 is structured such that it can be rotated through a clutch mechanism (not shown), the pinion 113 fitted with the spool shaft 105, the drive gear 114 frictionally connected with a handle shaft 115, and a handle B mounted on the handle shaft 115.

The clutch mechanism (not shown) is interposed between the spool shaft 105 and pinion 113 and can be operated on/off by a clutch operation lever 116.

A display device D of a measuring instrument C is disposed on the upper portion of the reel side plate 102.

The display device D is structured such that it can display various kinds of measured information and set information such as the value of a fishing line length and the like, which have been measured by the measuring instrument C, in numeric values by means of a liquid crystal display or the like. However, the display device D may also be structured such that, when the fishing reel is not operated for a given period of time, then the displayed numeric values on the liquid crystal display screen are to disappear.

The display values within the display device D are arranged long in a direction where the fishing line 112 is played out from the spool 104.

The display values within the display device D are composed of a numeric value portion a which is used to display the fishing line length value of 1 m or longer, a numeric value portion b which is used to display the fishing line length value of 1 m or shorter, and a display portion c used to display the on or off of the clutch mechanism.

The numeric value portion b is composed of a central numeric value portion, and a display portion which is disposed in the periphery of the central numeric value portion and can be turned on or off by a plurality of electronic circuits.

The clutch mechanism on or off of the display portion c can be displayed automatically by a switch (not shown).

A gear 117 is fitted with the small diameter portion 105b of the spool shaft 105 projecting outwardly of the side frame section 101a in a rotation preventive manner, while an E ring 118 is provided in order to prevent the gear 117 from being removed.

A rotary member 120 consisting of a gear included in the measuring instrument C is rotatably carried on a shaft portion 119 fixed to the side frame section 101a, while an E ring 121 is provided in order to prevent the rotary member 120 against removal.

The rotary member 120 consisting of a gear is in meshing engagement with the gear 117.

Not only a signal issuing magnet 122 but also a balancer 123 are respectively embedded in the rotary member 120 consisting of a gear.

A projecting portion 101e is provided on and projected from the outside of the side frame section 101a.

In the position of the projecting portion 101e that is opposed to the signal issuing magnet 122, there is disposed a magnetic sensor such as hall elements 124, 125.

The above-mentioned display device D, gear 117, rotary member 120, signal issuing magnet 122, and hall elements 124, 125 cooperate together in constituting the measuring instrument C.

In the upper portion of the reel side plate 103, there are provided a solar battery 126 and a plurality of switch operation buttons 127, 128, 129, 130, and 131 for their respective functional switches.

Figure 28:
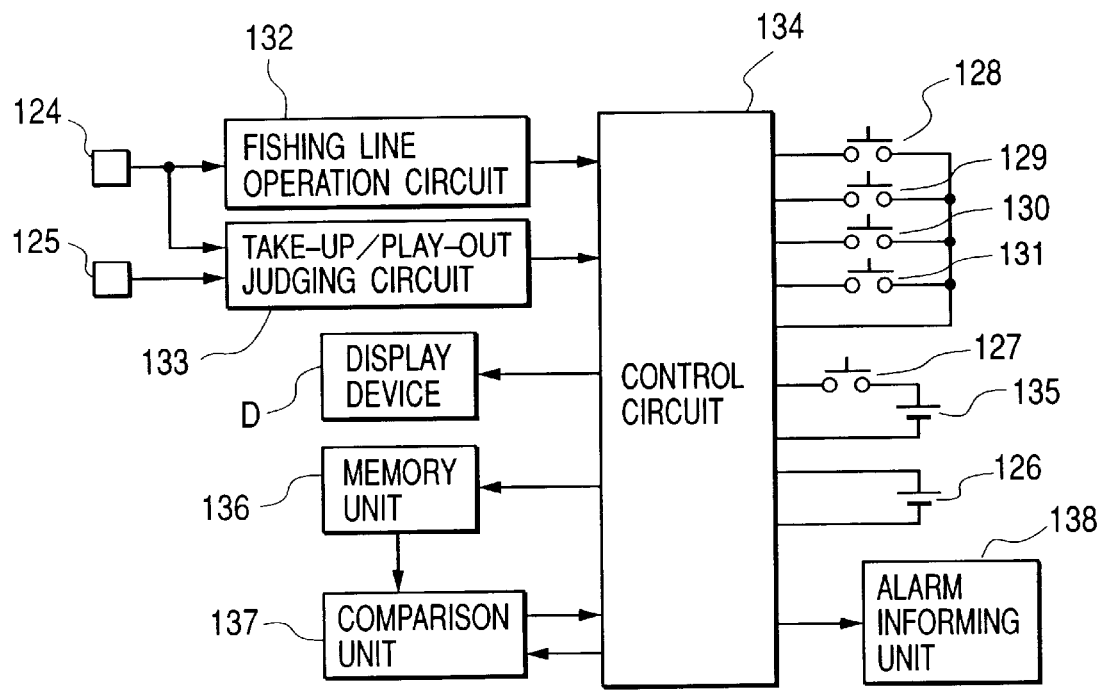
FIG. 28 is a block diagram of a control circuit of a measuring instrument employed in the fishing reel according to the seventh embodiment.
Figure 29:
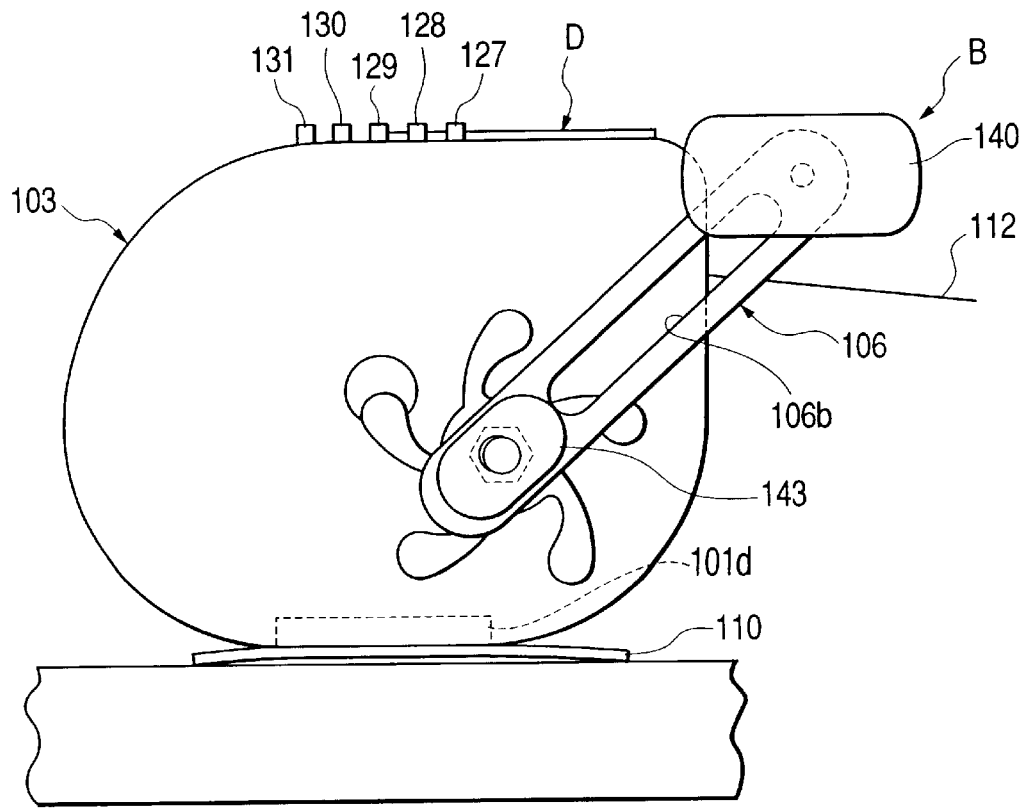
FIG. 29 is a side view of the handle side of the fishing reel according to the seventh embodiment.
Figure 30:
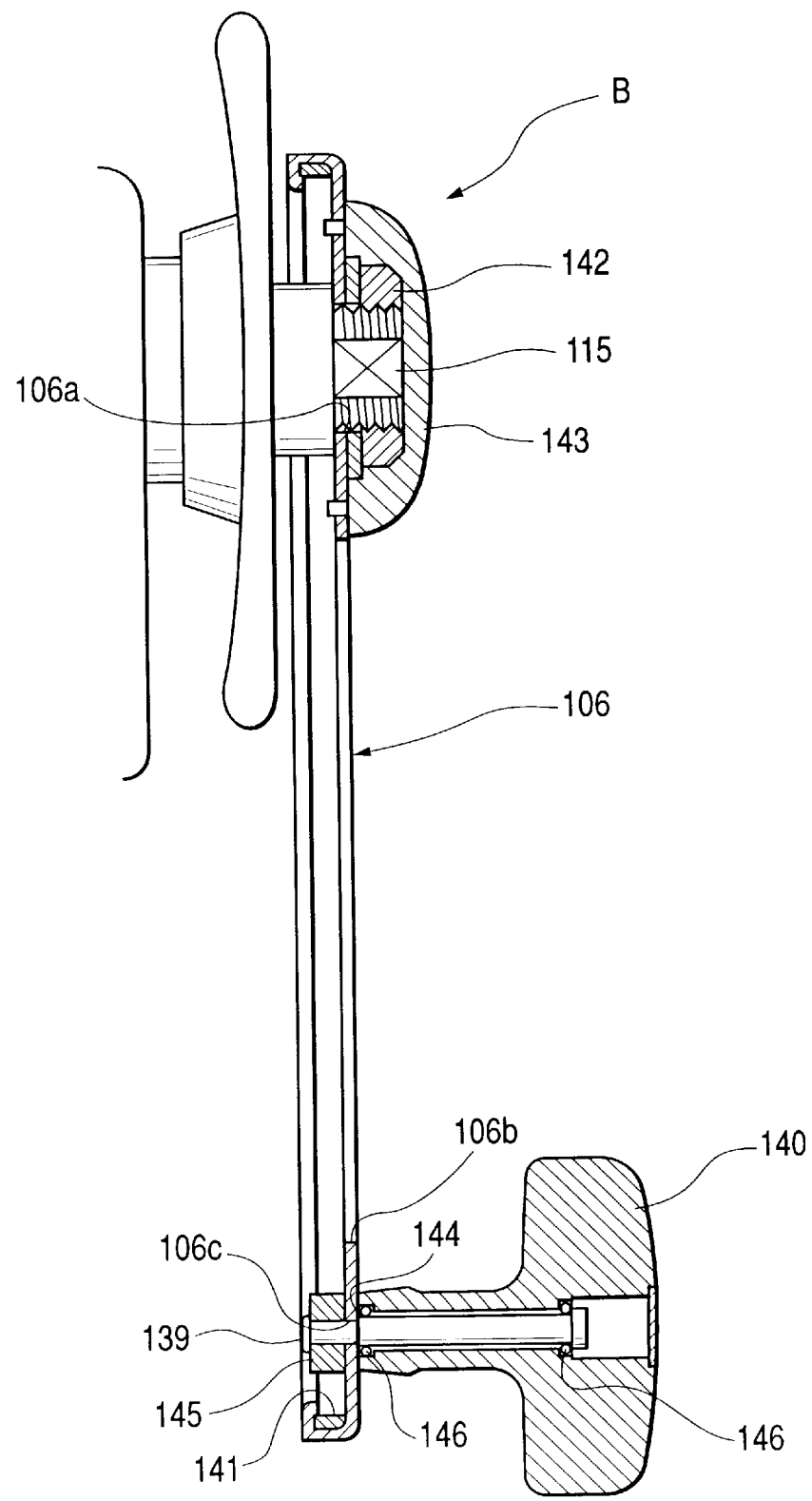
FIG. 30 is an enlarged sectional plan view of the handle employed in the fishing reel according to the seventh embodiment.

The magnetic sensor or hall element 124 of the measuring instrument C is connected to a fishing line length operation circuit 132 and a take-up/play-out judging circuit 133 which are respectively shown in FIG. 28, while the hall element 125 is connected to the take-up/play-out judging circuit 133.

In FIG. 28, there is shown a control circuit 134 which consists of a CPU included in the measuring instrument C; and, the display device D, the solar battery 126, the plurality of functional switches 127, 128, 129, 130, 131, a power supply battery 135, the fishing line length operation circuit 132, the take-up/play-out judging circuit 133, memory unit 136, comparison unit 137, and alarm informing unit 138 are respectively connected to the control circuit 34.

The solar battery 126 and the plurality of switch operation buttons 127, 128, 129, 130, and 131 for their respective functional switches, which are respectively located on the reel side plate 103 side, are respectively connected to the reel side plate 102 side of the control circuit 134 through lead wires (not shown) and hollow pillar 111.

Referring here to the functions of the plurality of functional switches as well as those of the switch operation buttons having the same designations as the functional switches, for example, the operational switch 127 and switch operation button 127 are used to turn on/off the power supply, the operational switch 128 and switch operation button 128 are used for resetting, the operational switch 129 and switch operation button 129 are used to obtain access to a shelf memory, the operational switch 130 and switch operation button 130 are used to turn on/off the alarm informing unit, and the operational switch 131 and switch operation button 131 are used to display tensile forces.

The fishing line length operation circuit 132 is a circuit which detects, by means of the hall element 124, the rotation of the rotary member 120 with the signal issuing magnet 122 of the measuring instrument C fixed thereto and converts the number of rotations detected to fishing line length values in accordance with rotation number signals.

The take-up/play-out judging circuit 133 is a circuit which judges the rotation direction of the rotary member 120, that is, the circuit 133 is structured such that, when the signal issuing magnet 122 is detected, it can judge the rotation direction of the rotary member 120 in accordance with whether the signals of the hall elements 124 and 125 are in the forward direction or in the reverse direction, thereby being able to judge the take-up or play-out direction of the fishing line.

The handle B is composed of a handle arm 106, a handle shaft portion 139 and a handle knob 140.

The handle arm 106 is formed by drawing a sheet metal into a long and narrow shape and includes in the interior portion thereof an annular core body 141 which is embedded there by curling the end face of the handle arm 106.

In the handle arm 106, there are formed a first rotation preventive through hole 106*a* into which the handle shaft 115 can be fitted in a rotation preventive manner, an elongated hole 106*b*, and a second rotation preventive through hole 106*c* into which the handle shaft portion 139 can be fitted in a rotation preventive manner.

A nut 142 is threadedly engaged with the handle shaft 115 which is inserted into the rotation preventive through hole 106*a*.

The nut 142 is covered with a cover 143.

One end of the handle shaft portion 139, which is inserted into the rotation preventive through hole 106*c* with a washer 144 interposed between them, is staked and fixed with a collar 145 between them.

The handle knob 140 is fitted with the outer periphery of the handle shaft portion 139 with ball bearings 146 between them.

A level wind device E is disposed on the fishing line play-out direction side of the spool 104 between the left and right side frame sections 101*a* and 101*b*.

A gear 147 is in meshing engagement with the drive gear 114.

A traverse cam shaft 148, which is included in the level wind device E, is mounted on the gear 147.

The level wind device E is composed of a guide cylinder 149, a fishing line guide body 150 which can be slided right and left along the outer periphery of the guide cylinder 149, the traverse cam shaft 148 carried by two bearings (not shown) respectively fixed to the two ends of the guide cylinder 149, and an engaging member (not shown) which is stored into the fishing line guide body 150 and can be engaged into a traverse groove formed in the traverse cam shaft 148.

A guide rod 151 is disposed on the rear side of the guide cylinder 149, whereby the fishing line guide body 150 can be moved and guided in the longitudinal direction along the guide cylinder 149 and guide rod 151.

Figure 22:
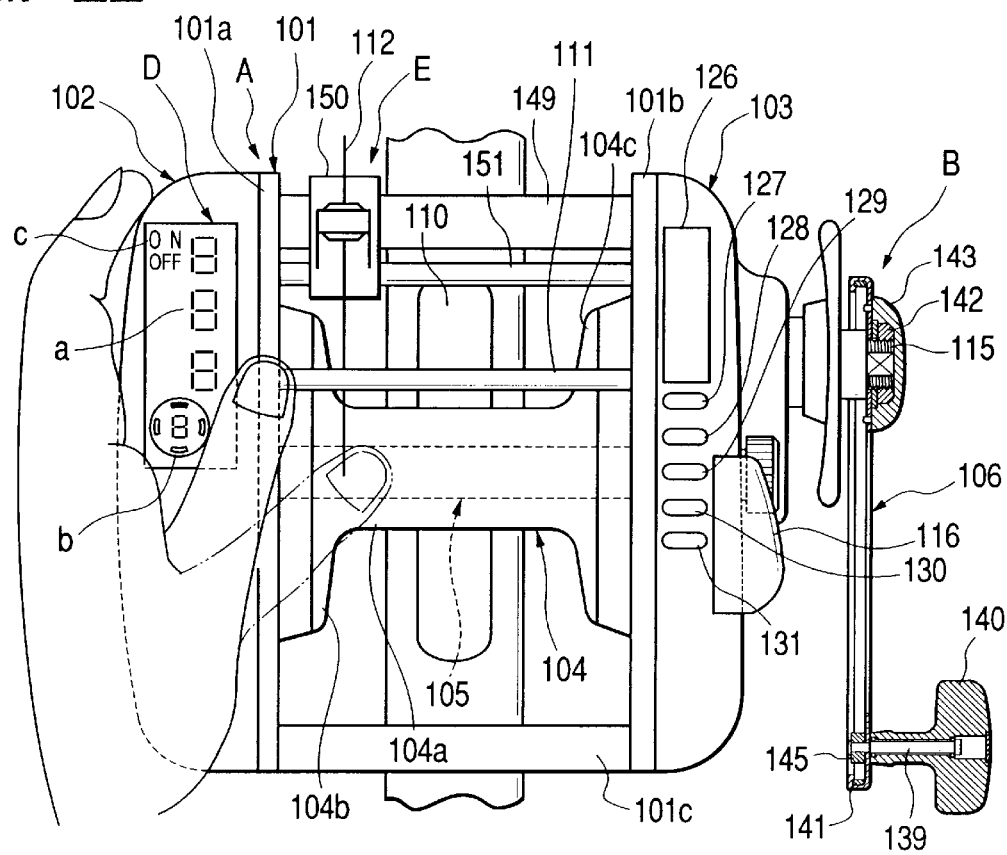
FIG. 22 is a partially sectional plan view of a seventh embodiment of a fishing reel according to the invention.
Figure 23:
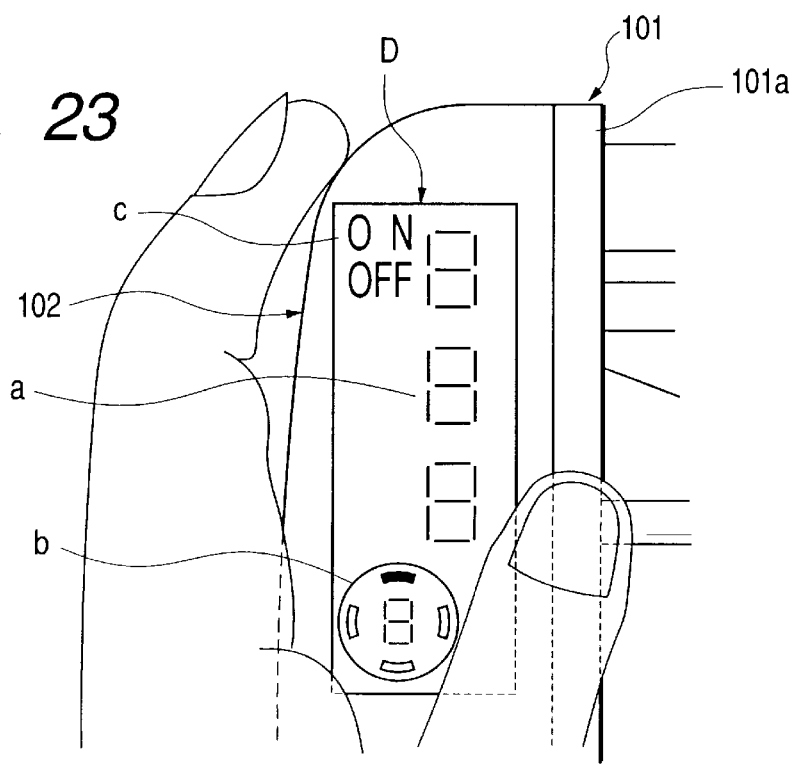
FIG. 23 is an enlarged plan view of a display device employed in the seventh embodiment.
Figure 24:
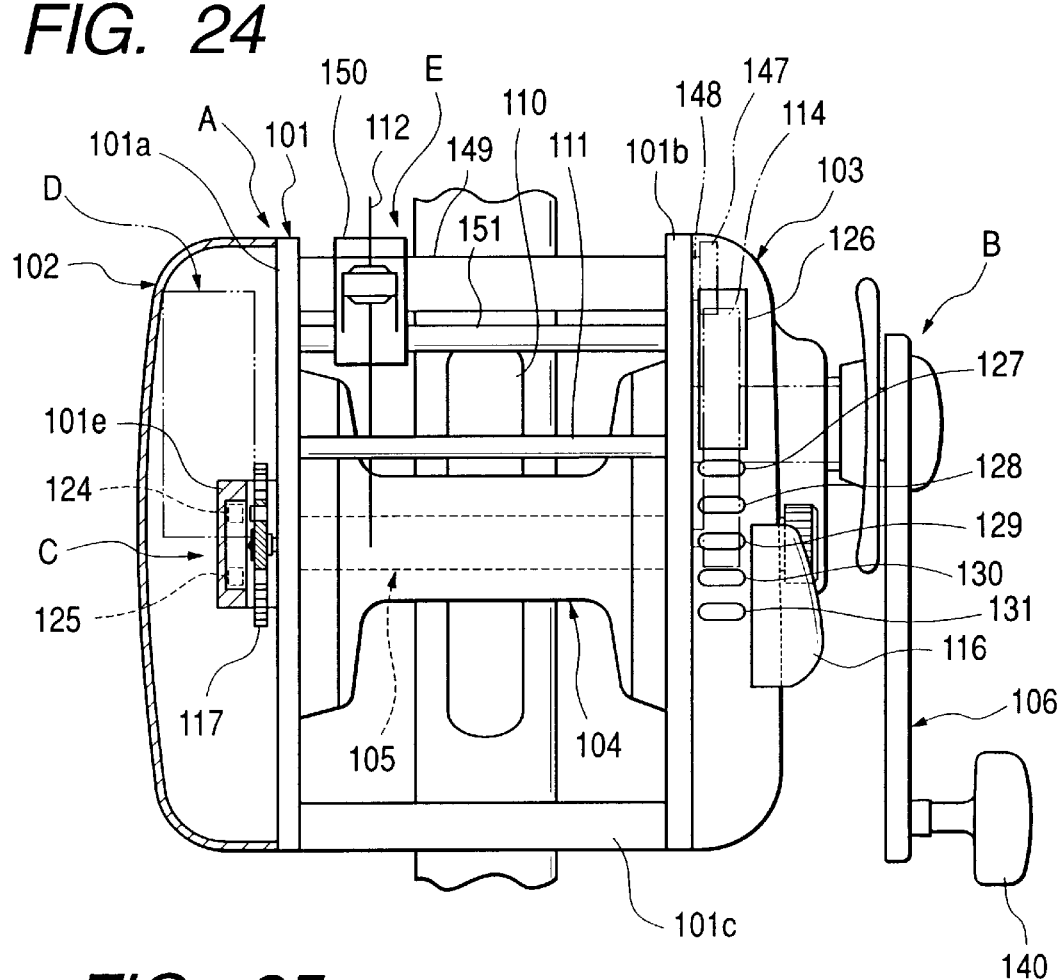
FIG. 24 is an another partially sectional plan view of the fishing reel according to the seventh embodiment.
Figure 25:
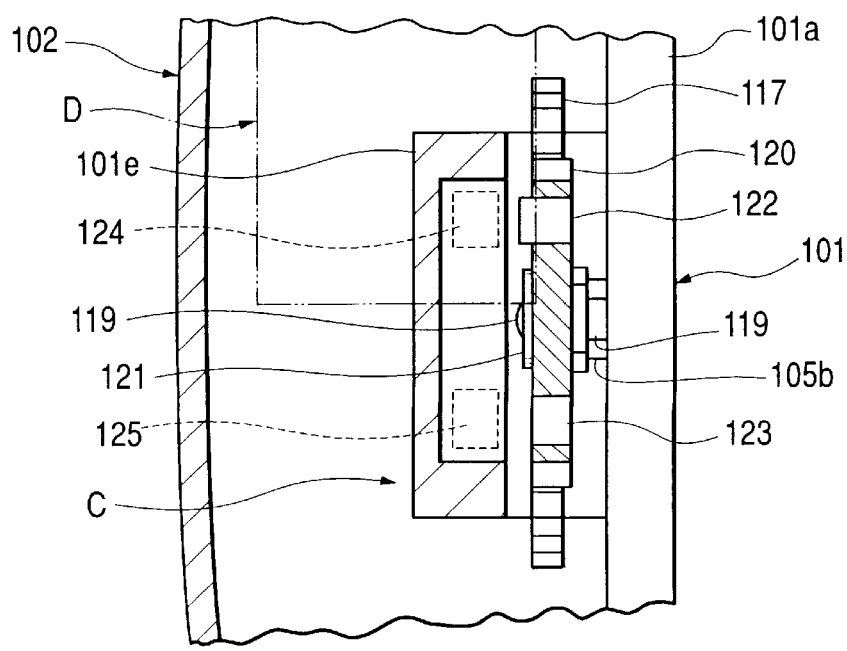
FIG. 25 is an enlarged sectional plan view of a side plate located on the opposite side of a handle in the fishing reel according to the seventh embodiment.
Figure 26:
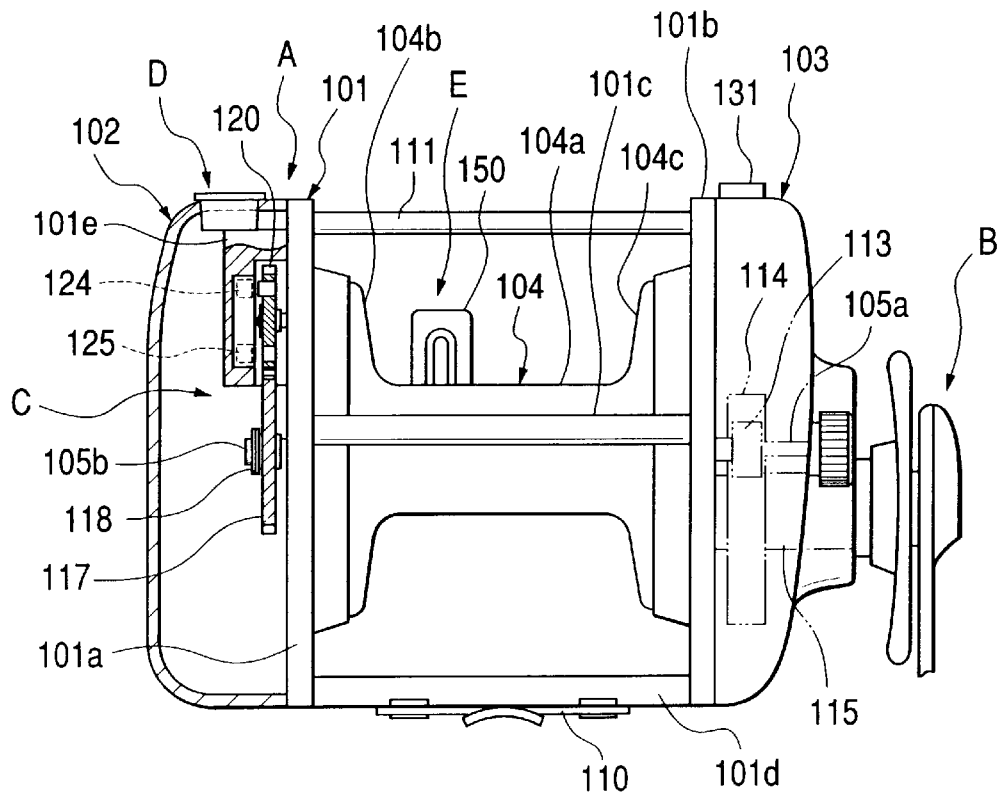
FIG. 26 is a partially sectional back view of the fishing reel according to the seventh embodiment.

Referring now to the operation of the present fishing reel, if the handle B is rotated in a direction where the fishing line 112 can be wound around the spool 104 in FIGS. 22 and 24, then the spool shaft 105 is rotated forwardly through the handle shaft 115, drive gear 114 and pinion 113 so that the fishing line 112 can be guided by the fishing line guide body 150 of the level wind device E and can be thereby taken up onto the spool 104.

Figure 27:
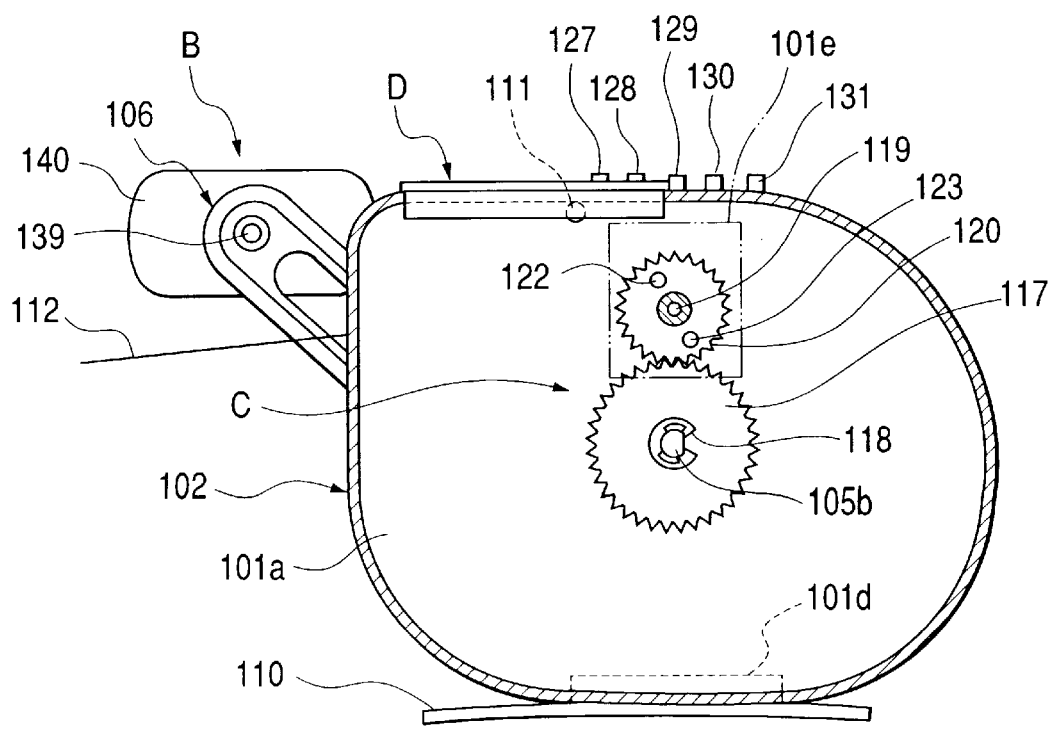
FIG. 27 is a sectional side view of the main portions of the fishing reel according to the seventh embodiment located inside the side plate on the opposite side of the handle.

If the spool 104 is rotated forwardly, then the signal issuing magnet 122 is rotated clockwise in FIG. 27, the number of rotations of the spool 104 is detected by the hall element 124, the thus detected number of rotations is converted to the fishing line length value by the fishing line length operation circuit 132, and the thus converted fishing line length value is displayed on the display device D, in more particular, in the numeric value portions a and b of the display device D.

Further, the detection of either of the hall elements 124, 125 is started and, if the signal of the signal issuing magnet 122 is found in the forward direction, then the take-up/play-out judging circuit 133 outputs a fishing line play-out signal, and, on the other hand, if the signal is in the opposite direction, then the circuit 133 outputs a fishing line take-up signal.

At the then time, the display portion c of the display device D is displaying the on state of the clutch mechanism.

Next, if the clutch mechanism is turned off by operating the clutch operation lever 116 and the terminal tackles (not shown) of the fishing reel is thereby lowered down onto the shelf position thereof, then the spool 104 is rotated reversely due to the play-out operation of the fishing line 112 so that the fishing line 112 can be guided and played out by the fishing line guide body 150 of the level wind device E.

At the then time, the display portion c of the display device D is displaying the off state of the clutch mechanism.

If the signal issuing magnet 122 is rotated reversely, then the number of rotations of the spool 104 is detected by the hall element 124 and is converted to the fishing line length value by the fishing line length operation circuit 132, and the thus converted fishing line length value is displayed on the display device D, so that the rotation direction of the spool 104 can be detected by the hall elements 124 and 125.

When storing the fishing line length value at the shelf position, if the switch operation button 129 for the shelf memory is pressed down, then the functional switch 129 is switched on so that the fishing line length can be stored into the memory unit 136.

If the fishing line 112 is played out, then an actually measured fishing line length value during fishing is input to the comparison unit 137; if the fishing line length value stored in the memory unit 136 coincides with the actually measured fishing line length value during fishing, then a coincidence signal is input from the comparison unit 137 into the control circuit 134 and is then output from the control circuit 134 to the alarm informing unit 138; and, if the alarm on/off switch 131 is on, then there is issued an alarm signal, thereby being able to inform that the actually measured fishing line length value during fishing is coincident with the fishing line length value stored in the memory unit 136.

When the display values within the display device D are arranged long in the play-out direction of the fishing line 112 which is played out from the spool 104, then the display of the display values changes in an ascending order from the bottom side thereof and, therefore, when compared with a case in which the display values are arranged in a horizontal manner or long sideways, they are easier to see. And, since the display device D stays in the width of the reel side plate 102 and does not project outwardly of the reel side plate 102, the fishing reel can be made compact and also can be improved in the gripping and holding property thereof.

Also, even if the display values are increased in size for easy seeing, it is possible to prevent the fishing reel from increasing in size.

Further, simply by changing the reel side plate 102, the shape and size of the display device D can be changed.

Still further, because the display device D of the measuring instrument C can be disposed on the upper portion of the reel main body A without reducing the space between the two reel side plates 102 and 103, the thumbing operation is easy to carry out as well as the insertability of the fishing line into the level wind device E can be improved.

Moreover, since nothing projects out laterally from the reel side plate 102, the display device D is hard to be effected by an external force caused by dropping down or being butted against other things.

When the handle arm 106 is formed by drawing a sheet metal into a long and narrow shape, then it is very light in weight and provides a good appearance.

If the fishing reel is structured in the above-mentioned manner, then the display device D of the measuring instrument C can be disposed on the upper portion of the reel main body A not only without protruding any component outwardly of the reel side plate 102 but also without reducing the space between the reel side plates 102 and 103. This can prevent the fishing reel from increasing in size, can enhance the gripping and holding property of the fishing reel, and can improve the thumbing operation as well as the fishing line insertability of the fishing reel.

Further, even if the display values are increased in size and are thereby made easier to see, an increase in the size of the fishing reel can be prevented.

Figure 31:
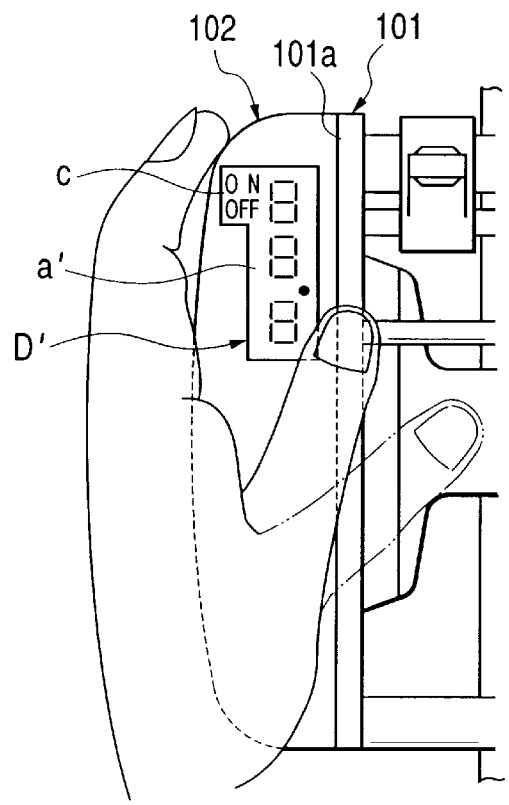
FIG. 31 is a plan view of the main portions of an eighth embodiment of a fishing reel according to the invention.

Now, FIG. 31 shows an eighth embodiment of a fishing reel according to the invention; and, FIG. 31 is a plan view of the main portions of the present fishing reel.

A display device D' employed in the eighth embodiment is formed in an inverted L shape; and, referring to display values within the display device D', the numeric value portion b for displaying the fishing line length values of 1 m or shorter is omitted from the display values within the display device D according to the seventh embodiment, whereas the lowest single figures of the numeric value portion a for displaying the fishing line length values of 1 m or longer according to the seventh embodiment are used to display the fishing line length values of 1 m or shorter.

That is, in the display device D', the display values are composed of a numeric value portion a' for displaying the fishing line length values and a display portion c for displaying the on or off state of the clutch mechanism.

The remaining portions of the structure of the display device D' are substantially the same as those of the previously described seventh embodiment.

Figure 32:
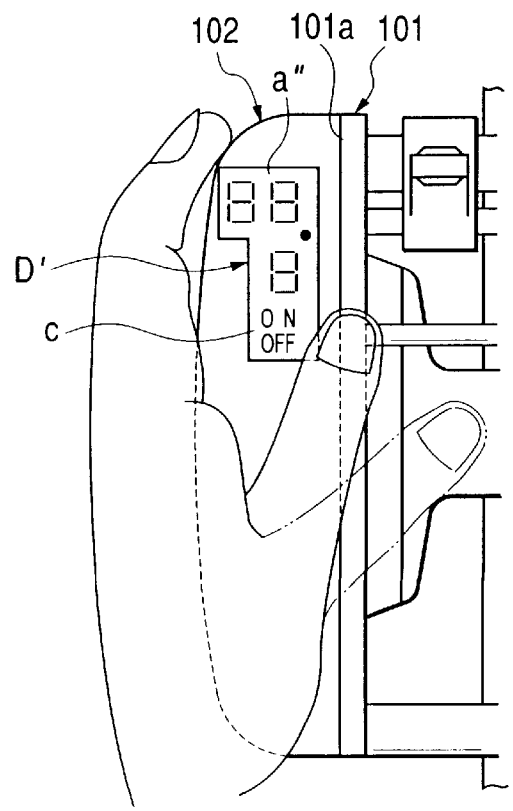
FIG. 32 is a plan view of the main portions of a ninth embodiment of a fishing reel according to the invention.

Now, FIG. 32 shows a ninth embodiment of a fishing reel according to the invention; and, FIG. 32 is a plan view of the main portions of the present fishing reel.

A display device D' employed in the ninth embodiment is formed in an inverted L shape; and, referring to display values within the present display device D', the characters of the upper second figures of a numeric value portion a" are situated in the position of the display portion c in the eighth embodiment, whereas a display portion c in the ninth embodiment is situated below the numeric value portion a".

The remaining portions of the structure of the display device D' according to the third embodiment are substantially the same as those of the previously described seventh and eighth embodiments.

Figure 33:
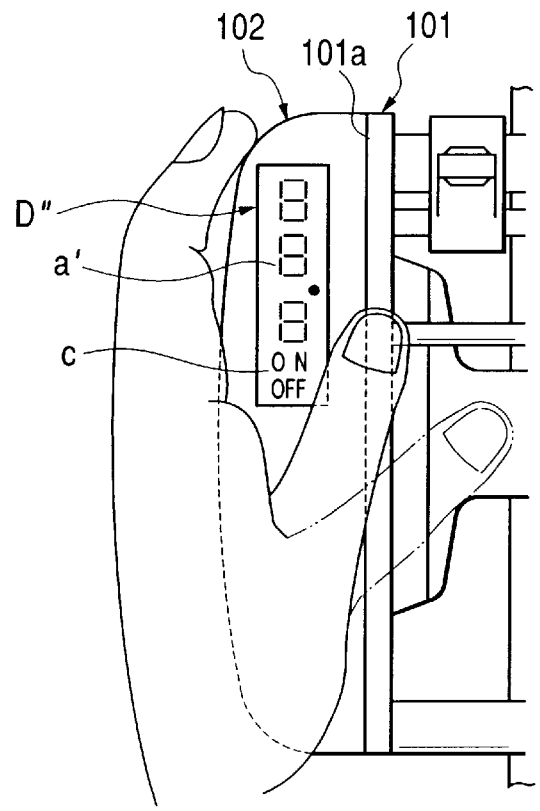
FIG. 33 is a plan view of the main portions of a tenth embodiment of a fishing reel according to the invention.

Now, FIG. 33 shows a tenth embodiment of a fishing reel according to the invention; and, FIG. 33 is a plan view of the main portions of the present fishing reel.

In the tenth embodiment, a display device D" is formed in a rectangle shape, while the display values of the present display device D" are composed of a numeric value portion a' for displaying the value of the length of a fishing line and a display portion c for displaying the on or off state of a clutch mechanism.

The remaining portions of the structure of the fishing reel according to the fourth embodiment are substantially the same as those of the previously described seventh and ninth embodiments.

Figure 34:
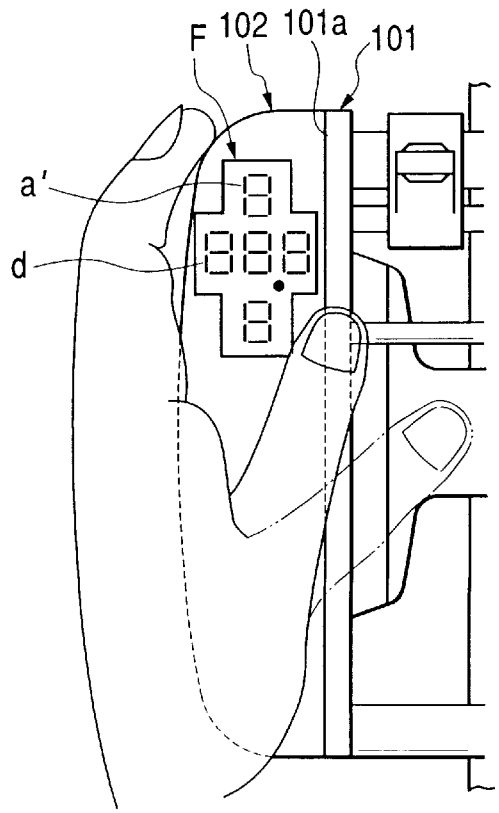
FIG. 34 is a plan view of the main portions of an eleventh embodiment of a fishing reel according to the invention.

Now, FIG. 34 shows an eleventh embodiment of a fishing reel according to the invention; and, FIG. 34 is a plan view of the main portions of the present fishing reel.

In the eleventh embodiment, a display device F is formed in a cross shape; and, referring to the display values of the display device F, a numeric value portion a' for displaying the value of a fishing line and a numeric value portion d for displaying the fishing line length value are arranged in a cross shape, so that the first figures sections of the two numeric value portions a' and d respectively for displaying the fishing line length value of 1 m or more can overlap with each other.

The remaining portions of the structure of the fishing reel according to the eleventh embodiment are substantially the same as those of the previously described seventh and eighth embodiments.

Figure 35:
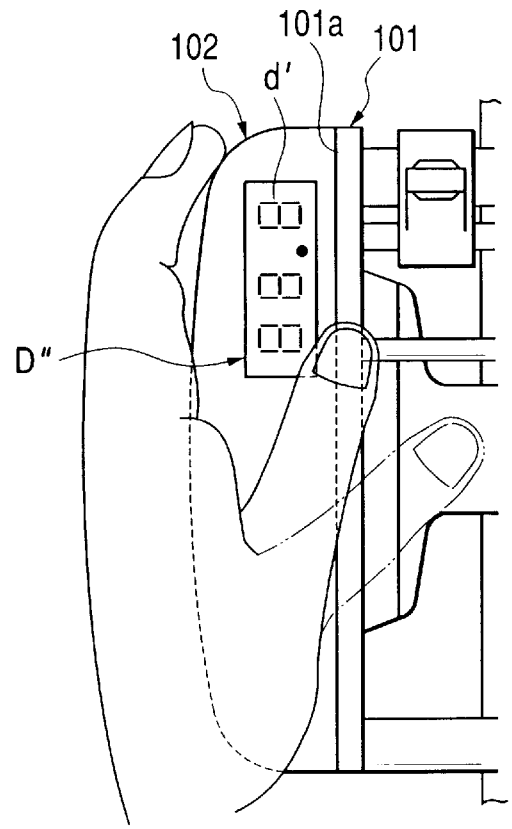
FIG. 35 is a plan view of the main portions of a twelfth embodiment of a fishing reel according to the invention.

Now, FIG. 35 shows a twelfth embodiment of a fishing reel according to the invention; and, FIG. 35 is a plan view of the main portions of the present fishing reel.

In the twelfth embodiment, a display device D" is formed in a rectangle shape; and, referring to the display values of the display device D", the digits and characters of a numeric value portion d' for displaying the value of the length of a fishing line are displayed in an inward direction.

The remaining portions of the structure of the fishing reel according to the twelfth embodiment are substantially the same as those of the previously described seventh and eleventh embodiments.

Figure 36:
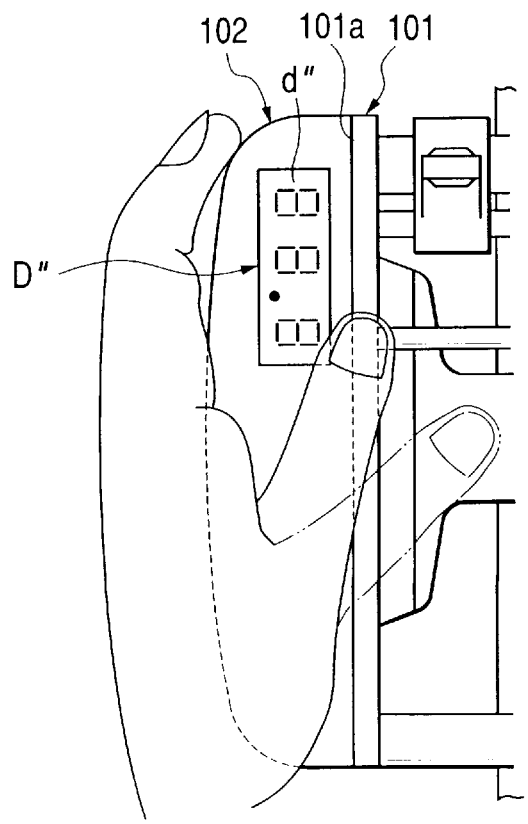
FIG. 36 is a plan view of the main portions of a thirteenth embodiment of a fishing reel according to the invention.

Now, FIG. 36 shows a thirteenth embodiment of a fishing reel according to the invention; and, FIG. 36 is a plan view of the main portions of the present fishing reel.

In the thirteenth embodiment, a display device D" is formed in a rectangle shape; and, referring to the display values of the display device D", the digits and characters of a numeric value portion d" for displaying the value of the length of a fishing line are displayed in an outward direction.

The remaining portions of the structure of the fishing reel according to the thirteenth embodiment are substantially the same as those of the previously described seventh and twelfth embodiments.

Figure 37:
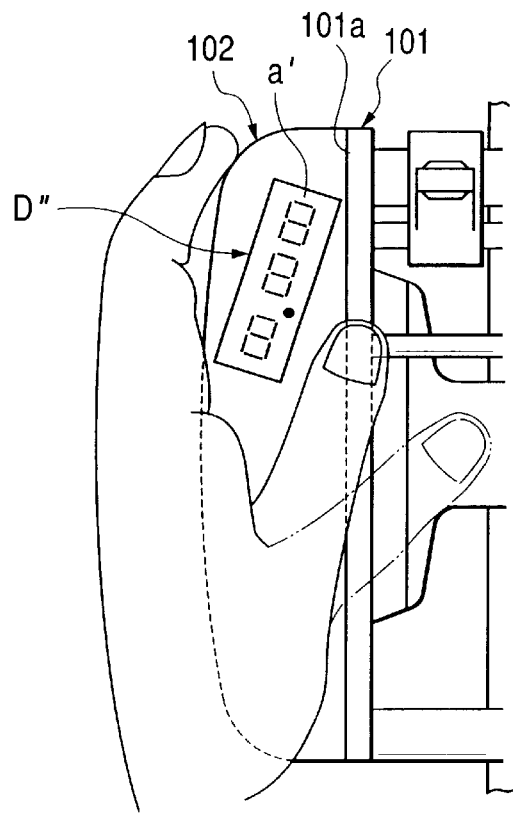
FIG. 37 is a plan view of the main portions of an fourteenth embodiment of a fishing reel according to the invention.

Now, FIG. 37 shows a fourteenth embodiment of a fishing reel according to the invention; and, FIG. 37 is a plan view of the main portions of the present fishing reel.

In the fourteenth embodiment, a display device D" is formed in a rectangle shape and is inclined to the right; and, referring to the display values of the display device D", there is provided a numeric value portion a' for displaying the value of the length of a fishing line.

The remaining portions of the structure of the fishing reel according to the fourteenth embodiment are substantially the same as those of the previously described seventh and eighth embodiments.

Figure 38:
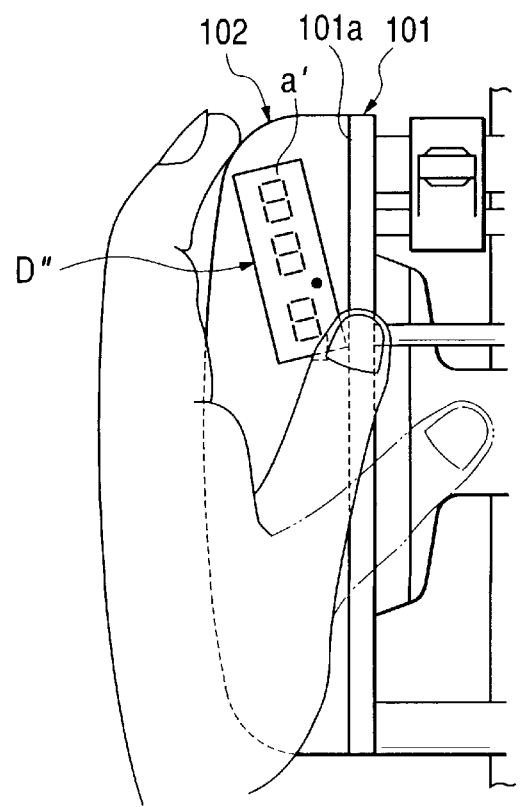
FIG. 38 is a plan view of the main portions of a fifteenth embodiment of a fishing reel according to the invention.

Now, FIG. 38 shows a fifteenth embodiment of a fishing reel according to the invention; and, FIG. 38 is a plan view of the main portions of the present fishing reel.

In the fifteenth embodiment, a display device D" is formed in a rectangle shape and is inclined to the left; and, referring to the display values of the display device D", there is provided a numeric value portion a' for displaying the value of the length of a fishing line.

The remaining portions of the structure of the fishing reel according to the fifteenth embodiment are substantially the same as those of the previously described seventh and fourteenth embodiments.

Figure 39:
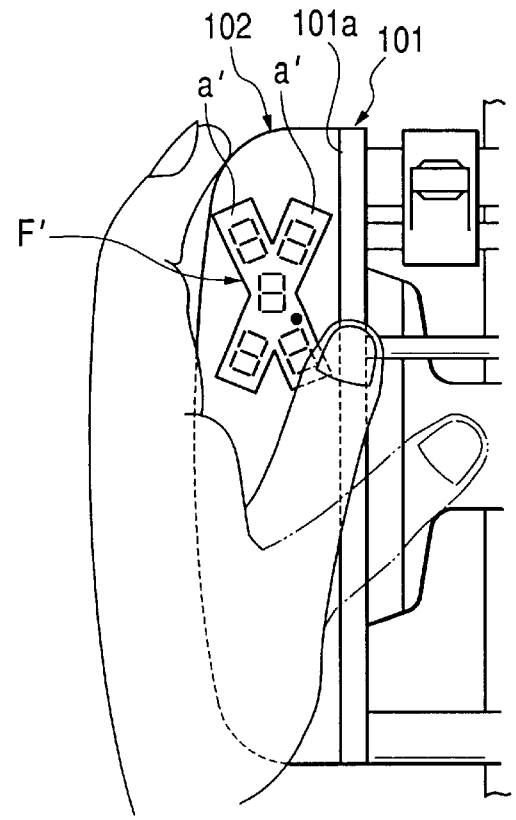
FIG. 39 is a plan view of the main portions of a sixteenth embodiment of a fishing reel according to the invention.

Now, FIG. 39 shows a sixteenth embodiment of a fishing reel according to the invention; and, FIG. 39 is a plan view of the main portions of the present fishing reel.

In the sixteenth embodiment, a display device F' is formed in an X shape; and, referring to the display values of the display device F', two numeric value portions a' respectively for displaying the value of the length of a fishing line are arranged in an X manner, so that the first figures sections of the two numeric value portions a' respectively for displaying the fishing line length value of 1 m or longer can overlap with each other.

The remaining portions of the structure of the fishing reel according to the sixteenth embodiment are substantially the same as those of the previously described seventh and fourteenth embodiments.

When the display device F' is formed in an X shape, even if the fishing reel is inclined in the fishing line play-out and take-up operations thereof, the digits of the display values are easy to read.

Figure 40:
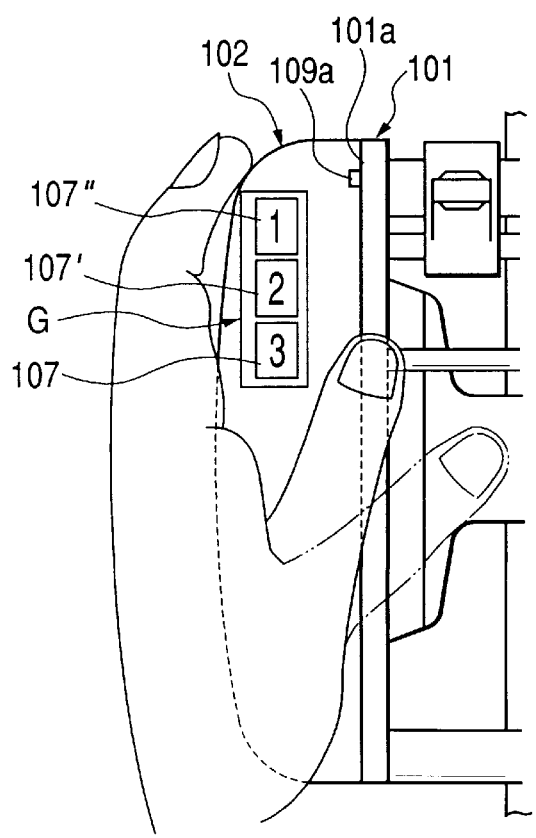
FIG. 40 is a plan view of the main portions of a seventeenth embodiment of a fishing reel according to the invention, showing an example of a display device of a mechanical type employed in the present fishing reel.
Figure 41:
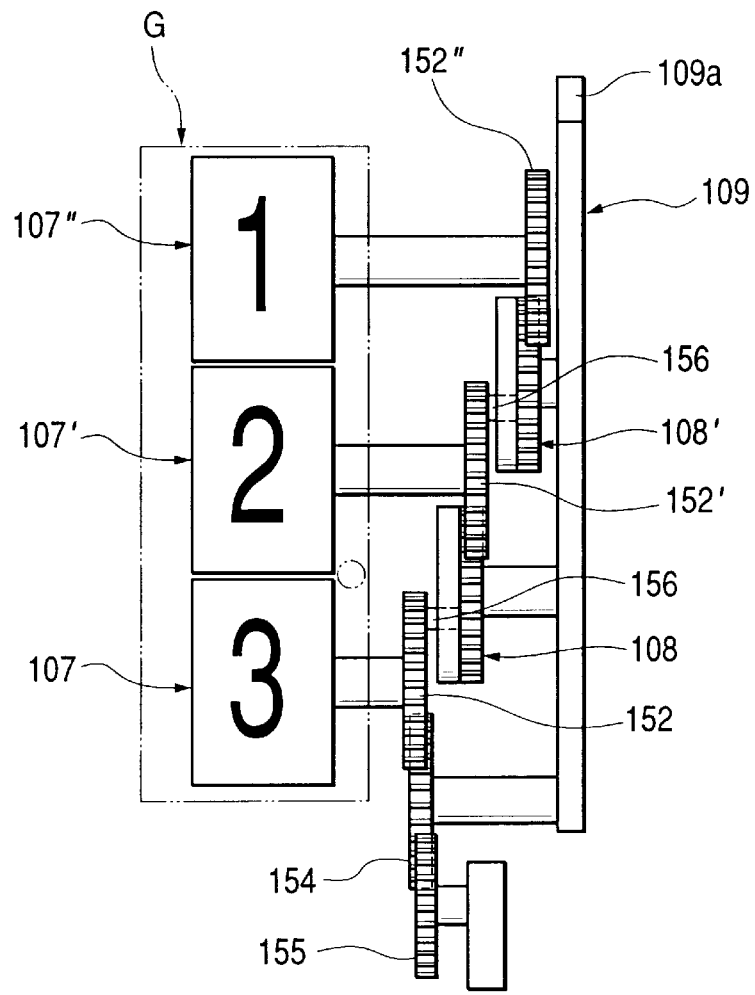
FIG. 41 is a general plan view of the interior portion of the display device shown in FIG. 40; and, FIG. 42 is a general side view of the interior portion of the display device shown in FIG. 40.
Figure 42:
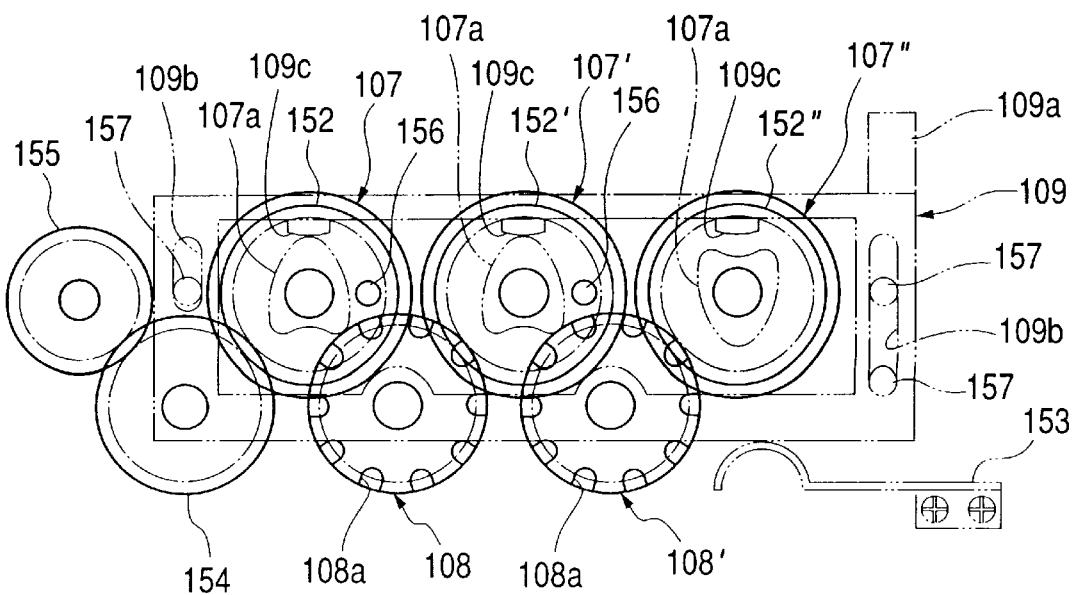

Now, FIGS. 40 to 42 show a seventeenth embodiment of a fishing reel according to the invention, in which there is employed a display device of a mechanical type.

In the seventeenth embodiment, the display device G comprises digit display wheels 107, 107', 107", gears 152, 152', 152" respectively connected to the digit display wheels 107, 107', 107" through their respective shafts, carry gears 108, 108', 108", a return-to-zero plate 109 supporting the carry gears 108, 108', 108" thereon through their respective shafts, a spring 153, and intermediate gears 154, 155.

On the side surfaces of the digit display wheels 107, 107', 107", there are provided not only return-to-zero heart cams 107a but also carry pins 156, respectively.

On the respective outer peripheries of the digit display wheels 107, 107', 107", there are printed digits 0 to 9.

The carry gears 108 and 108' are respectively formed of a gear and a disk and, in each of the disks, there are formed 10 pieces of recessed portions 108a in such a manner that the carry pin 156 can be inserted into and removed from these recessed portions 108a.

The return-to-zero plate 109 is formed a hollow parallelepiped shape, while the plate 109 includes a return-to-zero button 109a provided on the upper portion of one side corner thereof, two vertical holes 109b respectively formed on the two sides thereof, and three return-to-zero projections 109c respectively provided upwardly of the return-to-zero heart cams 107a.

A support pin 157 is inserted into the vertical hole 9b of the return-to-zero plate 109, so that the return-to-zero plate 109 can be moved in the vertical direction.

The intermediate gear 155 can be rotated by the spool shaft 105 through other gears, belts, pulleys and the like.

The shafts of the digit display wheels 107, 107', 107", support pin 157 and the like are held on the frame bodies of the reel side plate 102 and display device G by means of proper structures.

In the above description, there is illustrated the measuring instrument C structured such that the signal issuing magnet 122 is embedded in the rotary member 120 consisting of a gear. However, the measuring instrument C may also be structured such that the signal issuing magnet 122 is embedded in one side flange portion 104b of the spool 104.

Further, the measuring instrument C may also have another structure.

In the above description, the side frame 101 of the reel main body A is structured such that the two right and left side frame sections 11a and 101b thereof are held in parallel to and integrally with each other by the rear finger placement plate 101c, the fixing plate 101d of the reel leg 110, and the hollow pillar 111. However, the two right and left side frame sections 101a and 101b may also be formed separately and then they may be held in parallel to each other.

In the above description, there is illustrated the fishing reel of a hand-operated type in which the spool 4 can be rotated by turning the handle B manually. However, the present invention can also apply to a fishing reel of an electric type.

[Effects of the Invention]

The present invention is enforced in the above-mentioned embodiments and is able to provide effects as follows:

Since the display direction of the display values can be changed to a display direction which corresponds to the looking direction of an operator or an angler and is thus easy to see, such as a back-and-forth direction, a right and left direction and the like during an actual angling operation, the visual confirmation of the fishing line length and the like can be improved.

Also, because the display direction of the display values can be changed even if the direction of the reel main body is reversed left or right in accordance with whether the fishing reel is used as a left handle reel or as a right handle reel, the display values are easy to see with no trouble regardless of the direction of the handle, thereby being able to improve the efficiency of a fishing or angling operation.

Even if a fishing reel is manufactured according to the specification of one of the right and left handles, the fishing reel is also able to cope with the specification of the other handle, which makes it possible to reduce the manufacturing cost of the fishing reel.

Since the display device of the measuring instrument can be disposed on the upper portion of the reel main body not only without protruding the display device outwardly of the reel side plate but also without reducing the space between the two reel side plates, an increase in size of the fishing reel can be prevented, the gripping and holding property of the fishing reel can be enhanced, and the thumbing operation as well as the insertability of the fishing line can be improved.

Further, even if the display values of the display device are increased in size for easy reading, the fishing reel can be prevented from increasing in size.

What is claimed is:

1. A fishing reel comprising:
   a pair of side plates;
   a spool shaft provided between mounted to said pair of side plates;
   a spool rotatably supported to said spool shaft;
   a display device electrically displaying a specific display value, said display device being disposed on an upper portion of one of said side plates, and
   a switch, said switch, when engaged by a user, selectively switches a display direction of said specific display value.

2. The fishing reel according to claim 1, wherein said display direction of said specific display value is switchable to a first direction substantially parallel to said spool shaft, a second direction opposite to said first direction, a third direction substantially vertical to said spool shaft, and a fourth direction opposite to said third direction, whereby said specific display value is visible from up to down, or from left to right.

3. A fishing reel according to claim 2, wherein said display device includes a first display unit displaying the specific display value in the first and second directions, and a second display unit displaying the specific display value in the third and fourth directions, and
   said first and second display units are partially overlapped.

4. The fishing reel according to claim 1, further comprising:

a means for measuring a rotational velocity of said spool shaft, wherein said specific display value displayed by said display device changes display figures of said display value in accordance with said rotational velocity of said spool shaft.

5. A fishing reel according to claim 4, wherein said measuring means includes:

a rotary member interlocking with the rotation of said spool shaft;

a signal issuing magnet fixed to said rotary member;

a pair of hall elements detecting a signal of said magnet.

6. A fishing reel according to claim 1, said reel further comprising a handle for rotating said spool and being disposed adjacent to a first one of said pair of side plates, wherein said display device is disposed on the upper surface of a second one of said side plates provided in an opposite side to said handle.

7. A fishing reel according to claim 6, said reel further comprising:

a means for measuring a rotational velocity of said spool, wherein said measuring means is received within the second one of said side plates.

8. A fishing reel according to claim 7, wherein said measuring means includes:

a rotary member interlocking with the rotation of said spool shaft;

a signal issuing magnet fixed to said rotary member;

a pair of hall elements detecting a signal of said magnet.

9. A fishing reel comprising:

a spool;

a reel main body rotatably supporting said spool; and a display device displaying a plurality of figures representing a display value, said display device disposed on an upper portion of said reel main body, wherein said plurality of figures are arranged in a direction parallel to a direction where a fishing line is played out.

10. The fishing reel according to claim 9, wherein said reel main body has a pair of side plates, and said display device is disposed on an upper surface of one of said side plates.

11. The fishing reel according to claim 5, further comprising a handle for rotating said spool and being disposed adjacent to a first one of said pair of side plates, wherein said display device is disposed on the upper surface of a second one of said side plates provided on an opposite side to said handle.

12. The fishing reel according to claim 10, wherein said display device is disposed in a position which said display value is visible, in a condition that the fishing reel is gripped.

13. The fishing reel according to claim 9, wherein said display unit includes a plurality of first gears displaying said display value on a outer periphery thereof, and a second gear provided between said first gears, said second gear changing said display value displayed on one of said first gear by one in value, when the other of said first gear is rotated by 360°.

* * * * *